(12) United States Patent
Carnevali

(10) Patent No.: US 7,774,973 B2
(45) Date of Patent: Aug. 17, 2010

(54) FISHING ROD HOLDER

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 0 days.

(21) Appl. No.: 11/904,808

(22) Filed: Sep. 28, 2007

(65) Prior Publication Data

US 2009/0084019 A1  Apr. 2, 2009

(51) Int. Cl.
*A01K 97/10* (2006.01)
(52) U.S. Cl. .................. 43/21.2; 248/515; 248/516; 248/276.1
(58) Field of Classification Search ............. 43/21.2; 248/514–516, 276.1, 288.31, 479, 481, 484
See application file for complete search history.

(56) References Cited

U.S. PATENT DOCUMENTS

| | | | | | |
|---|---|---|---|---|---|
| 448,028 | A | * | 3/1891 | Hall | 43/21.2 |
| 544,300 | A | * | 8/1895 | Hanlon | 248/484 |
| 977,835 | A | * | 12/1910 | Piscator | 43/21.2 |
| 1,025,657 | A | * | 5/1912 | Towne | 43/21.2 |
| 1,268,096 | A | * | 6/1918 | Crandall | 248/516 |
| 1,460,697 | A | * | 7/1923 | Bendlin | 248/276.1 |
| 1,503,638 | A | * | 8/1924 | Cooper | 248/276.1 |
| 1,562,994 | A | * | 11/1925 | Stewart | 248/276.1 |
| 1,608,795 | A | * | 11/1926 | Kennedy | 248/516 |
| 1,789,509 | A | * | 1/1931 | Bergstrom | 248/516 |
| 1,800,349 | A | * | 4/1931 | Hurason | 403/57 |
| 1,938,643 | A | * | 12/1933 | Smith | 248/276.1 |
| 2,134,016 | A | * | 10/1938 | Zink | 248/484 |
| 2,301,885 | A | * | 11/1942 | Lachr | 43/21.2 |
| 2,314,633 | A | * | 3/1943 | Riedi | 43/7 |
| 2,416,828 | A | * | 3/1947 | Hamre | 248/515 |
| 2,452,279 | A | * | 10/1948 | Young | 43/21.2 |
| 2,481,118 | A | * | 9/1949 | Johns | 248/514 |
| 2,483,012 | A | * | 9/1949 | Koon | 248/515 |
| 2,506,824 | A | * | 5/1950 | Brown et al. | 248/515 |
| 2,516,759 | A | * | 7/1950 | Diderrich | 248/515 |
| 2,530,265 | A | * | 11/1950 | Phalen | 248/514 |
| 2,540,584 | A | * | 2/1951 | Ellsworth | 248/515 |
| 2,552,639 | A | * | 5/1951 | Menegay | 248/516 |
| 2,564,625 | A | * | 8/1951 | Jackson et al. | 43/21.2 |
| 2,580,130 | A | * | 12/1951 | Rowdon | 43/21.2 |
| 2,606,731 | A | * | 8/1952 | Harris | 43/21.2 |
| 2,621,877 | A | * | 12/1952 | Grigsby | 43/21.2 |
| 2,680,924 | A | * | 6/1954 | Menegay | 43/21.2 |
| 2,693,660 | A | * | 11/1954 | Nebergall et al. | 43/21.2 |

(Continued)

FOREIGN PATENT DOCUMENTS

EP  1327387 A1 * 7/2003

(Continued)

*Primary Examiner*—Darren W Ark
(74) *Attorney, Agent, or Firm*—Charles J. Rupnick, Attorney at Law

(57) ABSTRACT

A novel fishing rod holder is based upon a foundation member mountable on a vertical, horizontal or angled surface of a boat or other structure, and includes a socket member structured for releasably retaining a fishing rod; an adjustable attitude arm member coupled between the foundation and the socket member; a relatively rotatable and releasably interlockable ball-and-socket articulation mechanism coupled between the foundation and the arm adjacent to a first end thereof; and a relatively rotatable and releasably interlockable pivot mechanism coupled between the socket member and the arm member adjacent to a second end thereof.

22 Claims, 16 Drawing Sheets

U.S. PATENT DOCUMENTS

| | | | |
|---|---|---|---|
| 2,694,538 A * | 11/1954 | Consolo et al. | 248/516 |
| 2,724,569 A * | 11/1955 | Licata | 43/21.2 |
| 2,743,067 A * | 4/1956 | Stratton | 43/21.2 |
| 2,828,096 A * | 3/1958 | Beri | 43/21.2 |
| 2,917,257 A * | 12/1959 | Hinchliffe | 248/514 |
| 3,008,259 A * | 11/1961 | Zornes | 248/515 |
| D202,353 S * | 9/1965 | Wester | 43/21.2 |
| 3,212,740 A * | 10/1965 | Greenberg | 248/514 |
| 3,240,516 A * | 3/1966 | Barish et al. | 248/284.1 |
| 3,290,816 A * | 12/1966 | Eklof | 43/21.2 |
| 3,311,332 A * | 3/1967 | Takus | 248/514 |
| 3,428,286 A * | 2/1969 | Pesco | 248/481 |
| 3,484,066 A * | 12/1969 | Aunspaugh | 43/21.2 |
| D219,971 S * | 2/1971 | Bennett et al. | 43/21.2 |
| 3,564,753 A * | 2/1971 | Fravel | 43/21.2 |
| 3,783,547 A * | 1/1974 | Bystrom et al. | 43/21.2 |
| 3,792,829 A * | 2/1974 | Fickett | 43/21.2 |
| 3,910,538 A * | 10/1975 | Baitella | 248/276.1 |
| 3,934,801 A | 1/1976 | Johnson | |
| 3,977,117 A | 8/1976 | Zahner | |
| 4,017,998 A | 4/1977 | Dumler | |
| D246,661 S | 12/1977 | Engblom | |
| 4,078,756 A * | 3/1978 | Cross | 248/288.31 |
| 4,093,171 A * | 6/1978 | Mengo, Sr. | 248/515 |
| 4,142,315 A | 3/1979 | Hoffman | |
| 4,142,316 A | 3/1979 | Greer et al. | |
| 4,143,652 A * | 3/1979 | Meier et al. | 600/203 |
| 4,154,015 A | 5/1979 | Holland | |
| 4,197,668 A | 4/1980 | McKinsey | |
| 4,198,775 A | 4/1980 | Leisner | |
| 4,202,125 A | 5/1980 | Kovacs | |
| 4,217,720 A | 8/1980 | Karr | |
| 4,235,409 A | 11/1980 | Cummings | |
| 4,257,181 A | 3/1981 | Cooper | |
| 4,344,248 A | 8/1982 | Brophy, Sr. et al. | |
| 4,366,640 A | 1/1983 | Clapp | |
| 4,397,113 A | 8/1983 | Pinson | |
| 4,402,481 A * | 9/1983 | Sasaki | 248/282.1 |
| 4,407,089 A | 10/1983 | Miller | |
| 4,431,329 A * | 2/1984 | Baitelle | 248/276.1 |
| 4,455,779 A | 6/1984 | Cosic | |
| 4,471,553 A | 9/1984 | Copeland | |
| 4,486,968 A * | 12/1984 | Gould | 43/21.2 |
| 4,491,435 A * | 1/1985 | Meier | 248/276.1 |
| 4,495,721 A * | 1/1985 | Emory, Jr. | 43/21.2 |
| 4,510,709 A | 4/1985 | Melcher | |
| 4,517,761 A | 5/1985 | Bleggi | |
| 4,528,768 A | 7/1985 | Anderson | |
| 4,541,196 A | 9/1985 | Jershin | |
| 4,550,519 A | 11/1985 | Simmons et al. | |
| 4,581,838 A | 4/1986 | Moon | |
| 4,586,688 A | 5/1986 | Hartman et al. | |
| 4,614,323 A | 9/1986 | Bauer | |
| 4,640,038 A | 2/1987 | Jershin | |
| 4,641,453 A | 2/1987 | Roberts, Sr. | |
| 4,650,146 A | 3/1987 | Duke | |
| 4,674,222 A | 6/1987 | Hughes | |
| 4,676,018 A | 6/1987 | Kimball | |
| 4,676,019 A | 6/1987 | Engles | |
| 4,730,408 A | 3/1988 | Miller | |
| 4,739,575 A * | 4/1988 | Behrle | 43/21.2 |
| 4,778,141 A | 10/1988 | Bogar | |
| 4,793,086 A | 12/1988 | Cup | |
| 4,827,654 A * | 5/1989 | Roberts | 43/21.2 |
| 4,831,763 A * | 5/1989 | Alcorn | 43/21.2 |
| 4,852,290 A * | 8/1989 | Wallace et al. | 43/21.2 |
| 4,852,291 A * | 8/1989 | Mengo | 43/21.2 |
| 4,877,165 A | 10/1989 | Behrle | |
| D307,170 S | 4/1990 | Scott | |
| 4,928,915 A * | 5/1990 | Havins | 248/288.31 |
| 4,932,152 A * | 6/1990 | Barlotta et al. | 43/21.2 |
| 5,033,223 A | 7/1991 | Minter | |
| 5,054,229 A | 10/1991 | Hughes | |
| 5,054,737 A * | 10/1991 | DeLancey | 43/21.2 |
| 5,068,996 A | 12/1991 | Shank | |
| 5,088,224 A | 2/1992 | Gutierrez | |
| 5,121,565 A * | 6/1992 | Wille et al. | 43/21.2 |
| 5,142,809 A * | 9/1992 | O'Brien et al. | 43/21.2 |
| D330,753 S | 11/1992 | Gutierrez | |
| 5,163,652 A * | 11/1992 | King | 43/21.2 |
| 5,184,797 A * | 2/1993 | Hurner | 43/21.2 |
| 5,231,785 A * | 8/1993 | Roberts | 43/21.2 |
| D345,409 S | 3/1994 | Baynard | |
| 5,295,321 A | 3/1994 | Matura | |
| 5,313,734 A * | 5/1994 | Roberts | 43/21.2 |
| 5,335,440 A | 8/1994 | Williams | |
| 5,341,589 A | 8/1994 | Gutierrez | |
| 5,345,708 A * | 9/1994 | Loyd | 43/21.2 |
| D352,543 S | 11/1994 | Venable | |
| 5,359,802 A | 11/1994 | Gutierrez | |
| 5,365,689 A | 11/1994 | Holliman | |
| 5,367,815 A * | 11/1994 | Liou | 43/21.2 |
| 5,437,122 A | 8/1995 | Wilson | |
| 5,438,789 A | 8/1995 | Emory | |
| 5,446,989 A | 9/1995 | Strange et al. | |
| 5,460,306 A | 10/1995 | Rudd | |
| D365,870 S | 1/1996 | Miller | |
| D366,091 S | 1/1996 | Delekta et al. | |
| 5,501,028 A | 3/1996 | Hull et al. | |
| 5,560,137 A * | 10/1996 | Herring | 43/21.2 |
| 5,588,630 A * | 12/1996 | Chen-Chao | 248/515 |
| D386,557 S | 11/1997 | Thompson | |
| D388,153 S | 12/1997 | Snyder | |
| 5,724,763 A * | 3/1998 | Rasmussen | 43/21.2 |
| D394,486 S | 5/1998 | O'Neill | |
| 5,761,844 A * | 6/1998 | Horschel | 43/21.2 |
| 5,845,885 A * | 12/1998 | Carnevali | 248/181.1 |
| 5,855,087 A | 1/1999 | Risinger | |
| 5,871,196 A | 2/1999 | Martelli | |
| 5,873,191 A | 2/1999 | Bova et al. | |
| 5,937,567 A | 8/1999 | Elkins | |
| 5,975,479 A | 11/1999 | Suter | |
| 5,987,801 A | 11/1999 | Anderson | |
| 5,987,804 A | 11/1999 | Shearer et al. | |
| 5,992,081 A | 11/1999 | Elkins | |
| D418,195 S | 12/1999 | Perry | |
| 5,996,958 A | 12/1999 | Baynard et al. | |
| 6,003,746 A | 12/1999 | Richardson | |
| 6,052,937 A | 4/2000 | Morong | |
| 6,094,851 A | 8/2000 | Guidry | |
| 6,112,449 A * | 9/2000 | Blackwell | 43/21.2 |
| 6,209,835 B1 * | 4/2001 | Walrath et al. | 248/276.1 |
| D443,020 S | 5/2001 | Ratza et al. | |
| D447,213 S | 8/2001 | Rossman | |
| 6,269,584 B1 | 8/2001 | Peaschek | |
| 6,269,990 B1 * | 8/2001 | Gray | 43/21.2 |
| 6,301,820 B1 | 10/2001 | Rosa | |
| 6,302,367 B1 * | 10/2001 | Ratza et al. | 43/21.2 |
| 6,318,017 B1 | 11/2001 | Genardo | |
| 6,363,650 B1 | 4/2002 | Beeler | |
| 6,381,897 B1 | 5/2002 | Walsh | |
| 6,394,401 B1 * | 5/2002 | St. Peter | 248/122.1 |
| D460,144 S | 7/2002 | Huy, Jr. | |
| 6,421,948 B1 | 7/2002 | Craig | |
| D461,522 S | 8/2002 | James et al. | |
| 6,430,864 B1 | 8/2002 | Thomure et al. | |
| D465,006 S | 10/2002 | Kissner | |
| 6,484,433 B1 | 11/2002 | Greene | |
| 6,487,813 B2 | 12/2002 | Baynard et al. | |
| 6,499,248 B2 | 12/2002 | Thompson | |
| 6,561,476 B2 * | 5/2003 | Carnevali | 248/288.31 |
| 6,585,400 B2 * | 7/2003 | Leen | 362/418 |
| 6,591,541 B1 * | 7/2003 | Cummings | 43/21.2 |
| 6,594,941 B1 | 7/2003 | Anderson | |

| | | |
|---|---|---|
| 6,626,409 B1 | 9/2003 | Thompson |
| 6,637,146 B2 | 10/2003 | Ernst |
| D483,436 S | 12/2003 | Tull |
| 6,898,893 B1 * | 5/2005 | Mukdaprakorn ............ 43/21.2 |
| 6,941,694 B2 | 9/2005 | Ernst |
| 6,962,018 B1 * | 11/2005 | King ........................ 43/21.2 |
| 6,974,113 B1 | 12/2005 | Clark et al. |
| 6,988,701 B1 * | 1/2006 | Lin ........................... 248/514 |
| 7,017,296 B2 | 3/2006 | Templeman et al. |
| D525,675 S | 7/2006 | Munn |
| 7,086,194 B1 | 8/2006 | Troyer, Jr. |
| 7,086,195 B2 | 8/2006 | Borgeat |
| 7,089,699 B2 | 8/2006 | Borgeat |
| 7,114,281 B2 | 10/2006 | Miller |
| 7,131,232 B1 | 11/2006 | Fecht |
| 7,296,377 B2 * | 11/2007 | Wilcox et al. ................. 43/21.2 |
| 7,406,795 B1 * | 8/2008 | Follmar ...................... 43/21.2 |
| D589,113 S * | 3/2009 | Perry ....................... D22/147 |
| 7,637,466 B2 * | 12/2009 | Dillard ................. 248/288.31 |
| 2002/0116860 A1 | 8/2002 | Ernst |
| 2003/0089021 A1 | 5/2003 | Miller |
| 2003/0217500 A1 | 11/2003 | Ernst |
| 2004/0025404 A1 | 2/2004 | Thompson |
| 2004/0144016 A1 | 7/2004 | Harden |
| 2006/0011795 A1 * | 1/2006 | Dobbins .................. 248/276.1 |
| 2006/0254118 A1 | 11/2006 | Warecke |
| 2008/0134565 A1 * | 6/2008 | Sutherland et al. ........... 43/21.2 |
| 2008/0155881 A1 * | 7/2008 | Carnevali .................... 43/21.2 |

FOREIGN PATENT DOCUMENTS

| | | | |
|---|---|---|---|
| JP | 09182551 A | * | 7/1997 |
| JP | 2000023609 A | * | 1/2000 |
| JP | 2002065135 A | * | 3/2002 |
| JP | 2002238429 A | * | 8/2002 |
| JP | 2002291390 A | * | 10/2002 |
| JP | 2006067855 A | * | 3/2006 |
| WO | WO 9742812 A1 | * | 11/1997 |

* cited by examiner

FISHING ROD HOLDER

FIELD OF THE INVENTION

The present invention relates to the field of fishing rod holding devices, and in particular to universal fishing rod holding devices having an adjustable attitude arm mechanism.

BACKGROUND OF THE INVENTION

Fishing rod holding devices are generally well-known and commonly used to relieve strain from a person engaged in fishing by supporting a fishing rod by its handle until such time as a fish is hooked on the line. The wait time until the fish is hooked can be quite extended so that a comfortable position and attitude of the rod holder is paramount.

However, known fishing rod holding devices are limited in their ability to provide such a comfortable position and attitude of the rod holder.

SUMMARY OF THE INVENTION

The present invention is a novel universally positionable fishing rod holder providing a range of motion sufficient to provide a comfortable position and attitude in virtually all mounting circumstances.

According to one aspect of the invention, the novel fishing rod holder is based upon a foundation member mountable on a vertical, horizontal or angled surface of a boat or other structure, and includes a socket member structured for releasably retaining a fishing rod; an adjustable attitude arm member coupled between the foundation and the socket member; a relatively rotatable and releasably interlockable ball-and-socket articulation mechanism coupled between the foundation and the arm adjacent to a first end thereof; and a relatively rotatable and releasably interlockable pivot mechanism coupled between the socket member and the arm member adjacent to a second end thereof.

According to another aspect of the novel fishing rod holder, the pivot mechanism is fully pivotable about a pivot axis relative to the second end of the arm member.

According to another aspect of the novel fishing rod holder, the socket member is substantially aligned with the ball-and-socket articulation mechanism.

According to another aspect of the novel fishing rod holder, the pivot mechanism is laterally offset relative to the ball-and-socket articulation mechanism.

According to another aspect of the novel fishing rod holder, the pivot mechanism is offset relative to the ball-and-socket articulation mechanism a first distance greater than a second distance between the pivot mechanism and one end the socket member.

According to another aspect of the novel fishing rod holder, the pivot mechanism further includes: a stationary disk adjacent to an end of the arm member distal from the ball-and-socket articulation mechanism; a pivot disk coupled to the socket member and substantially aligned with the stationary disk along the pivot axis; a releasably interlockable interface joint between respective opposing faces of the stationary and pivot disks; and an axial clamping mechanism operable along the pivot axis between the stationary and pivot disks. According to another aspect of the novel fishing rod holder, the interface joint between respective opposing faces of the stationary and pivot disk is further configured as a stepwise interface joint. According to another aspect of the novel fishing rod holder, the stepwise interface joint is further configured with mating teeth and sockets provided between the opposing faces of the stationary and pivot disks.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
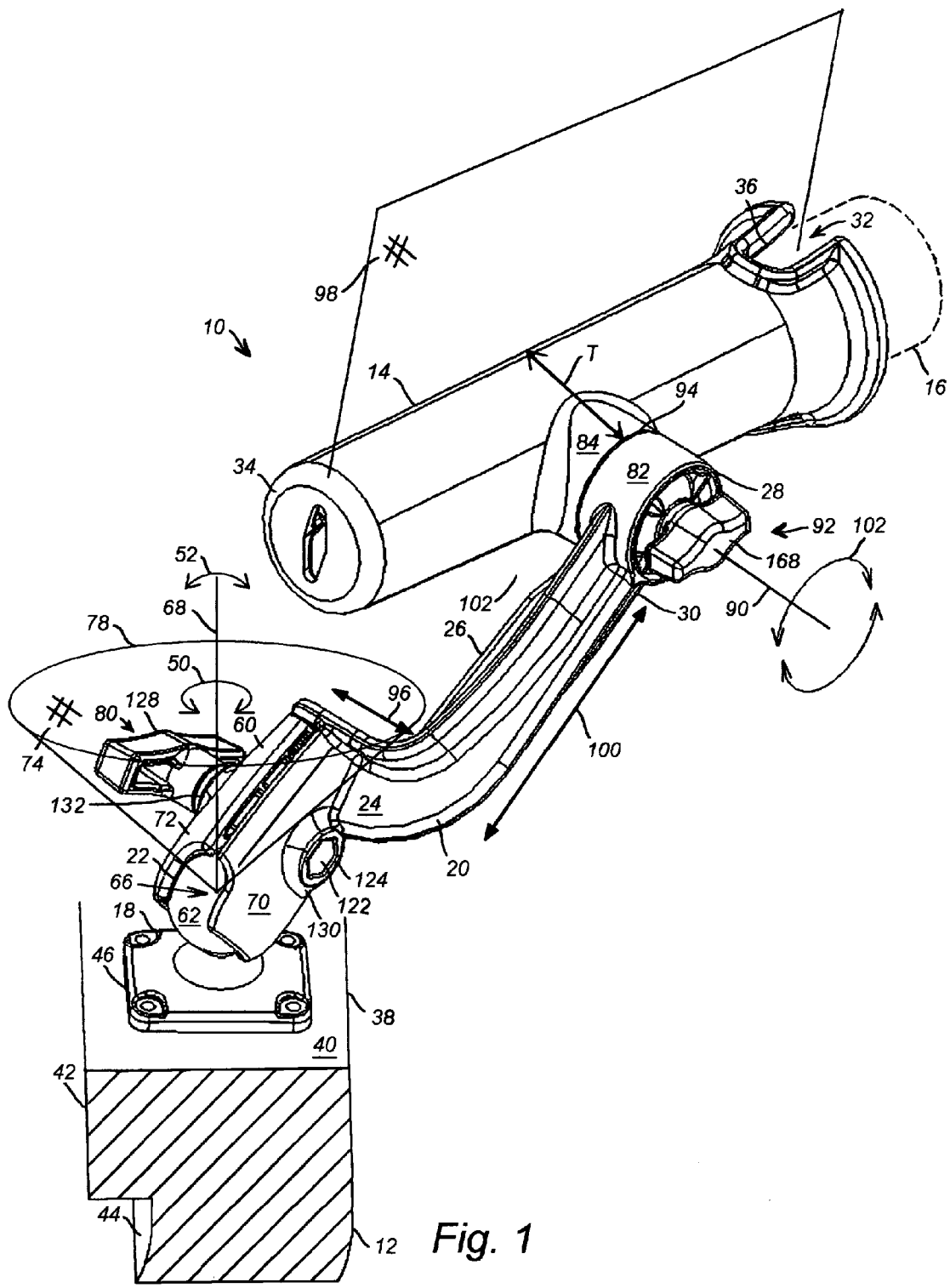
FIG. 1 and FIG. 2 are perspective views showing opposite sides of a novel fishing rod holder of the present invention illustrated by example and without limitation as being configured in a first attitude with respect to a boat.
Figure 2:
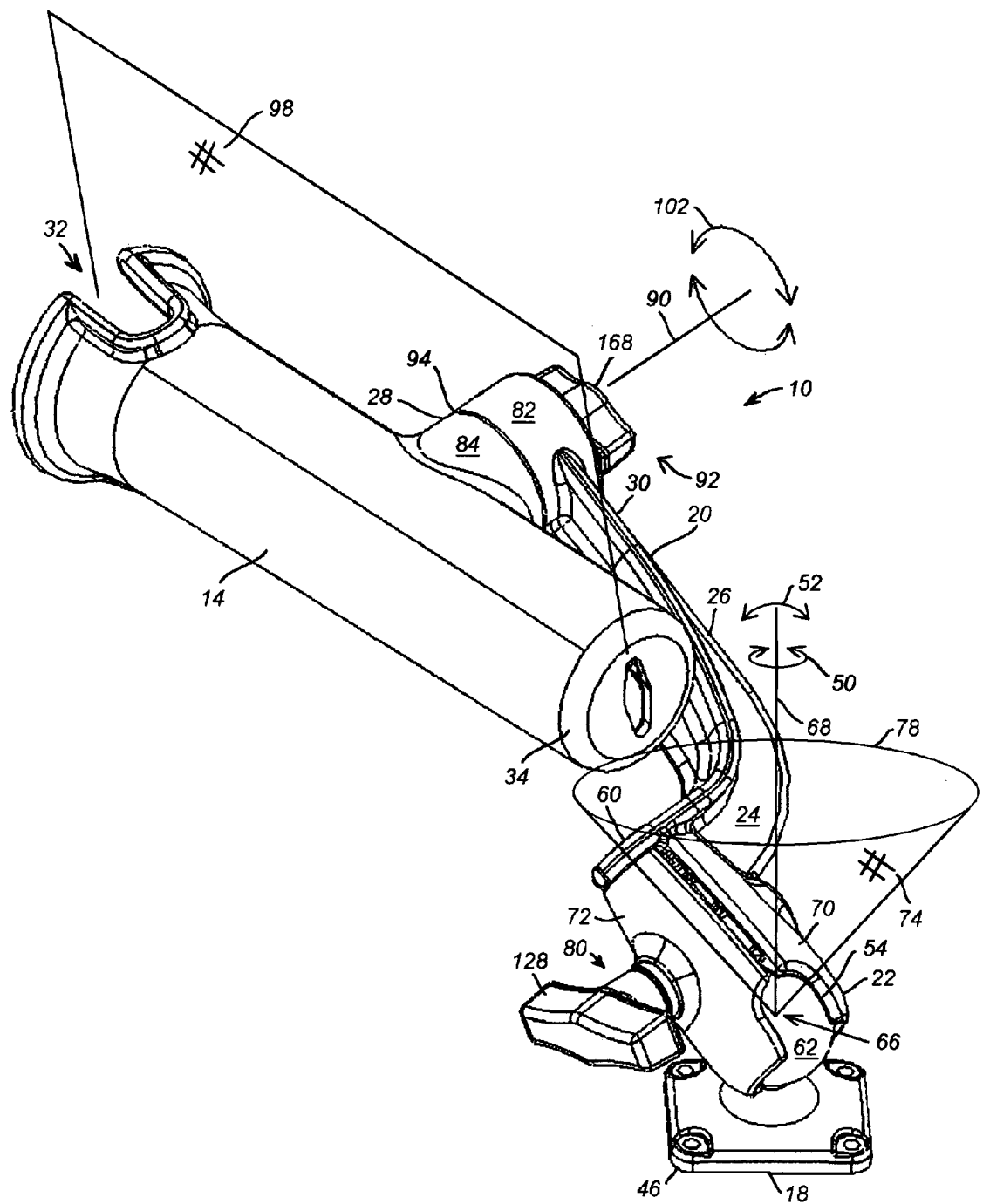

FIG. 1 and FIG. 2 are perspective views showing opposite sides of the fishing rod holder 10 of the present invention that is illustrated by example and without limitation as being configured in a first attitude with respect to a boat 12. Here, the fishing rod holder 10 is illustrated by example and without limitation as having a fishing rod socket member 14 structured for releasably retaining a handle 16 (shown in dashed outline) of a conventional fishing rod, and a foundation member 18 coupled to the boat 12 in a fixed position. An adjustable attitude arm member 20 is coupled between the foundation member 18 and the socket member 14. A relatively rotatable and releasably interlockable ball-and-socket articulation mechanism 22 is coupled between the foundation member 18 and the arm member 20 adjacent to a proximate first end 24 of a lengthwise portion 26 thereof, and a releasably interlockable pivot mechanism 28 is coupled between the socket member 14 and the arm member 20 adjacent to a second end 30 of the lengthwise portion 26 thereof distal of the ball-and-socket articulation mechanism 22.

The fishing rod socket member 14 is of a type structured for releasably retaining the fishing rod handle 16, as is generally well-known in the art. The precise configuration for the socket member 14 is a matter of choice among alternative means well known in the art, and references in the claims to the fishing rod socket member are not intended to limit the invention to the choice of any one such fishing rod socket member, or to choice of any particular kind of fishing rod socket member; rather, alternative fishing rod socket members are also contemplated and may be substituted without deviating from the scope and intent of the present invention.

Here, the fishing rod socket member 14 is formed of a strong and substantially rigid material, such as metal or rigid plastic and is illustrated by example and without limitation as a type of tubular socket member, having an upper open end 32 and a lower partially closed end 34, which is sized to encircle the handle 16 of a conventional fishing rod, which handle 16 is slideably received through upper open end 32. To accommodate insertion of handle 16 into tubular socket member 14, open end 32 is optionally slightly flared or bell mounted. Tubular socket member 14 defines one or more slots 36 that communicate with open end 32 and extends a distance along the longitudinal axis of the tubular socket member 14. The slots 36 are optionally inwardly tapered so as to better slideably receive an open face reel associated with the fishing rod handle 16.

The foundation member 18 is of a type structured for being fixed onto a gunwale or railing 38 of the boat 12, either on a top surface 40 or an inside surface 42 thereof, else onto an inside (shown) or outside surface of the boat's hull 44. For example, a base mounting flange 46 portion of the foundation member 18 may be securely screwed, bolted, or welded onto the boat's gunwale 38 or hull 44. The precise means of securing the foundation member 18 in a fixed position with respect to the boat 12 is a matter of choice among alternative means well known in the art, and references in the claims to the holder being "fixed" are not intended to limit the invention to the choice of any one such securing means, or to choice of any particular kind of securing means; rather, alternative securing means are also contemplated and may be substituted without deviating from the scope and intent of the present invention. The foundation member 18 is not moved with respect to the boat 12 during use of the fishing rod holder 10; rather, the user only moves the adjustable attitude arm member 20 with respect to the foundation member 18 by means of the releasably interlockable ball-and-socket articulation mechanism 22, and/or moves the socket member 14 with respect to the arm member 20 by means of the releasably interlockable pivot mechanism 28, each in the manner detailed below.

The releasably interlockable ball-and-socket articulation mechanism 22 coupled between the foundation member 18 and the arm member 20 is both rotatable and pivotable on the releasably interlockable ball-and-socket joint mechanism 22, as indicated by the arrows 50 and 52, respectively. The ball-and-socket joint mechanism 22 is disclosed here by example and without limitation as utilizing the relatively rotatable and interlockable ball-and-socket joint mechanism disclosed by Jeffrey D. Carnevali, the inventor of the present fishing rod holder 10, in U.S. Pat. No. 5,845,885, entitled "Universally Positionable Mounting Device," issued Dec. 8, 1998, the complete disclosure of which is incorporated herein by reference. Alternatively, the interlockable ball-and-socket joint mechanism 14 is disclosed here by example and without limitation as the interlockable ball-and-socket joint mechanism disclosed in U.S. Pat. No. 6,561,476, entitled "Positively-Positionable Mounting Apparatus," issued to Jeffrey D. Carnevali, the inventor of the present fishing rod holder 10, on May 13, 2003, the complete disclosure of which is incorporated herein by reference.

Figure 4:
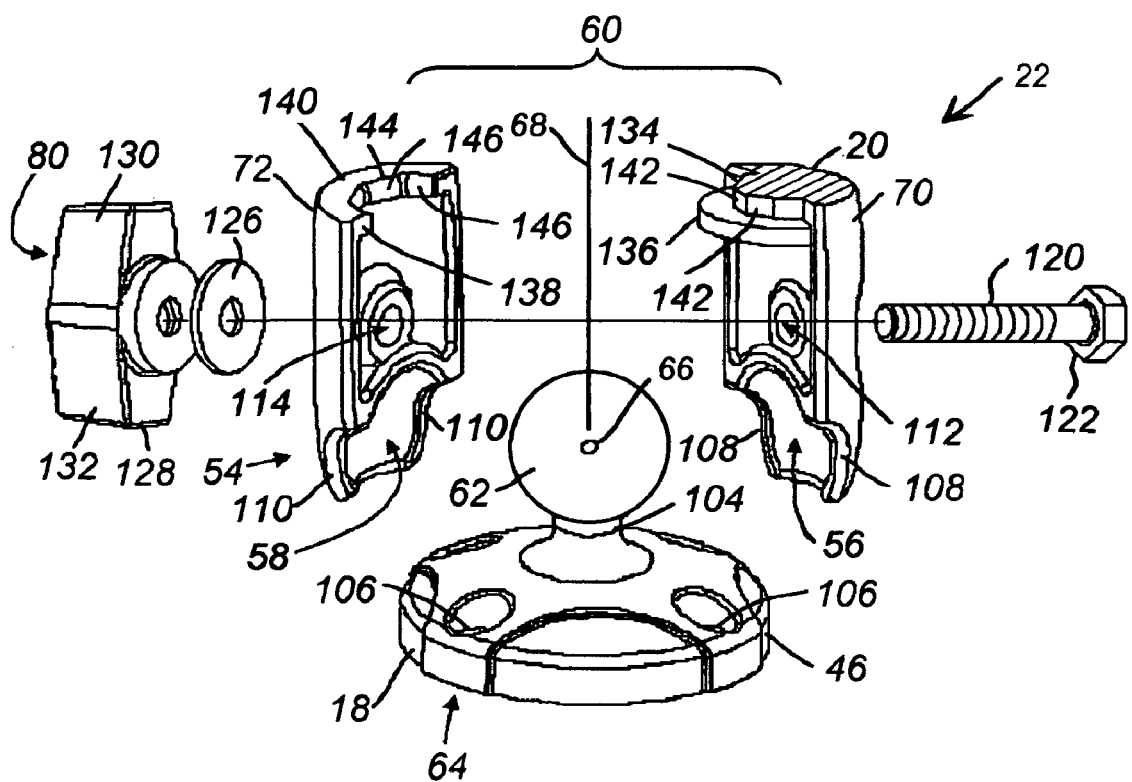
FIG. 4 is an exploded view of the releasably interlockable ball-and-socket articulation mechanism of the novel fishing rod holder.

As more clearly illustrated by example and without limitation in FIG. 4, the relatively rotatable and releasably interlockable ball-and-socket joint mechanism 22 includes a relatively rotatable ball-and-socket joint 54 formed between a pair of operatively opposing first and second sockets 56 and 58 formed in a compressible split arm assembly 60 portion of the arm member 20 in cooperation with a part-spherical head 62 of a ball-end mount or "coupler" 64 of the foundation member 18. A geometric spherical center 66 of the part-spherical head 62 of the coupler 64 defines a spherical center of revolution or "roll" of the ball-and-socket joint 54 contained in an axis of revolution 68 projected substantially upright of the base mounting flange 46 portion of the foundation member 18. The split arm assembly 60 includes a pair of relatively rigid arm sections 70 and 72 split and operatively juxtaposed across a plane 74 substantially bisecting the part-spherical head 62 of the coupler 64 through its geometric center 66, which is also the center of revolution of the ball-and-socket joint 54. The relatively rigid arm sections 70 and 72 of the split arm assembly 60 form the pair of operatively opposing first and second sockets 56, 58 of the ball-and-socket joint 54 adjacent to the proximate first end 24 of the lengthwise arm portion 26. The ball-and-socket joint 54 thus permits the arm member 20 to rotate via split arm assembly 60 in a continuous circumvolution about the axis of revolution 68 upright of the base mounting flange 46, as indicated by the arrow 50, and furthermore to swivel about the coupler 64 within a continuous conical section 78, as indicated by the arrow 52, having its apex at the geometric spherical center 66 of the coupler's part-spherical head 62 and the center of revolution of the ball-and-socket joint 54. The sockets 56, 58 of the ball-and-socket joint 54 thus swivel and rotate about its center of revolution 66 for adjusting the arm member 20 between different rotational orientations and angular attitudes relative to the foundation member 18 and the boat 12 generally within the conical zone 78 centered on the spherical center of revolution 66 and swept about the upright axis of revolution 68. A transverse clamping mechanism 80 is operable substantially transverse of the plane 74 along which the arms sections 70, 72 are split for releasably squeezing together the pair of arm sections 70, 72. When the transverse clamping mechanism 80 is operated for squeezing together the pair of arm sections 70, 72 across the splitting plane 74, the compressed arm sections 70, 72 releasably interlock their respective arm sockets 56, 58 with the part-spherical head 62 of the coupler 64 portion of the foundation member 18.

The fishing rod socket member 14 is pivotable on the arm member 20 by operation of the releasably interlockable pivot mechanism 28 coupled therebetween. For example, the pivot mechanism 28 includes a stationary disk 82 either formed on or otherwise rigidly attached to the arm member 20. By example and without limitation, the stationary disk 82 is optionally positioned adjacent to the distal second end 30 of the lengthwise arm portion 26, but is optionally positioned intermediate of the lengthwise arm portion's proximate first and distal second ends 24, 30 without deviating from the scope and intent of the present invention.

The pivot mechanism 28 also includes a cooperating pivot disk 84 either formed on or otherwise rigidly attached to the socket member 14. By example and without limitation, when the fishing rod socket member 14 is a tubular socket member, as illustrated here, the pivot disk 84 is optionally positioned approximately intermediately between the upper and lower ends 32, 34. However, the pivot disk 84 is alternatively optionally positioned closer or adjacent to either of the upper and lower ends 32, 34 without deviating from the scope and intent of the present invention.

Figure 5:
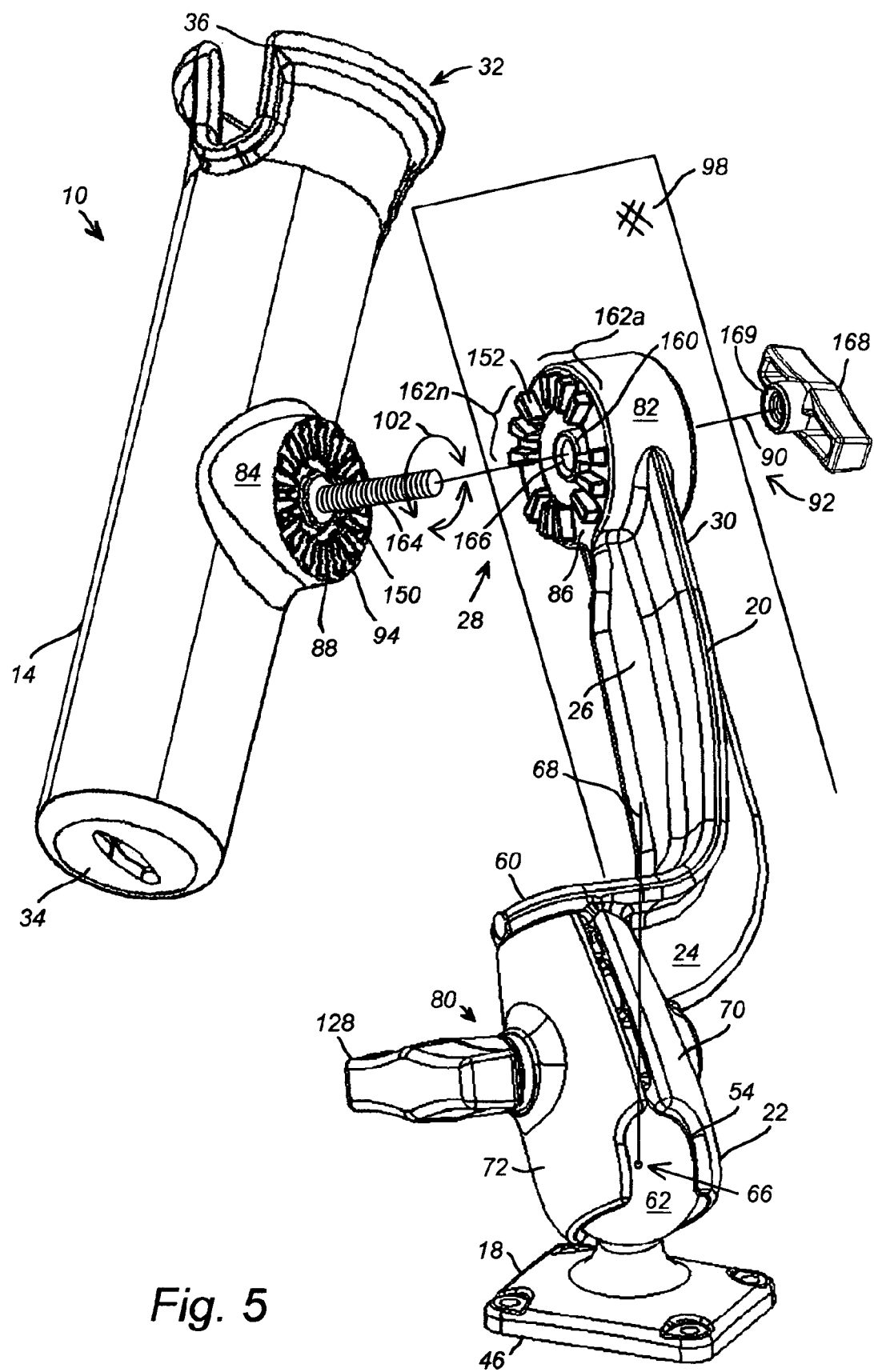
FIG. 5 is an exploded view of the releasably interlockable pivot mechanism of the novel fishing rod holder operating between the distal second end of the lengthwise arm portion of the arm member and the fishing rod socket member.

As more clearly illustrated in FIG. 5, opposing insertion and receptor faces 86 and 88 of the respective stationary and pivot disks 82 and 84 are substantially aligned along a pivot axis 90 oriented substantially transverse of the plane 74 along which the arms sections 70, 72 of the split arm assembly 60 are split, i.e., substantially transverse of both the socket member 14 and the arm member 20. The pivot disk 84 is transversely pivotable about the pivot axis 90 relative to the stationary disk 82, whereby the socket member 14 is angularly adjustable relative to the distal second end 30 of the lengthwise arm portion 26 of the arm member 20.

An axial clamping mechanism 92 is operable along the pivot axis 90 between the stationary and pivot disks 82 and 84 for forming a releasably interlockable interface joint 94 between the respective opposing disk faces 86 and 88. Accordingly, the transverse clamping mechanism 80 and axial clamping mechanism 92 are independently operable for adjusting, respectively, the angular and rotational attitude of the arm member 20 relative to the foundation member 18 and the boat 12 generally, and adjusting the angular orientation of the socket member 14 transversely of the distal second end 30 of the lengthwise arm portion 26 of the arm member 20.

Furthermore, as illustrated here the proximate first end 24 of the lengthwise arm portion 26 forms a lateral offset 96 of the arm member 20 relative to the ball-and-socket joint mechanism 22 a distance approximately equivalent to one half of a thickness T of the fishing rod socket member 14. In other words, the lateral offset 96 of the arm member 20 relative to the ball-and-socket joint mechanism 22 is sufficient for positioning the socket member 14 approximately coplanar with the ball-and-socket joint 54, which lateral offset 96 maximizes stability of the socket member 14 relative to the foundation member 18. Accordingly, when the lateral offset 96 substantially aligns the socket member 14 approximately coplanar with the ball-and-socket joint 54, the pivot mechanism 28 pivots the socket member 14 within a pivot plane 98 substantially perpendicular to the pivot axis 90 of the pivot mechanism 28 and bisecting the part-spherical head 62 of the coupler 64 through its geometric center 66 and the center of revolution of the ball-and-socket joint 54.

Additionally, the lengthwise arm portion 26 forms a longitudinal offset 100 of the pivot mechanism 28 relative to the ball-and-socket joint mechanism 22 sufficient for the lower partially closed end 34 of the socket member 14 to clear when the pivot mechanism 28 is operated to swing the socket member 14 in a continuous circumvolution, i.e., a complete circle, within the pivot plane 98 about the pivot axis 90, as indicated by arrows 102.

Figure 3:
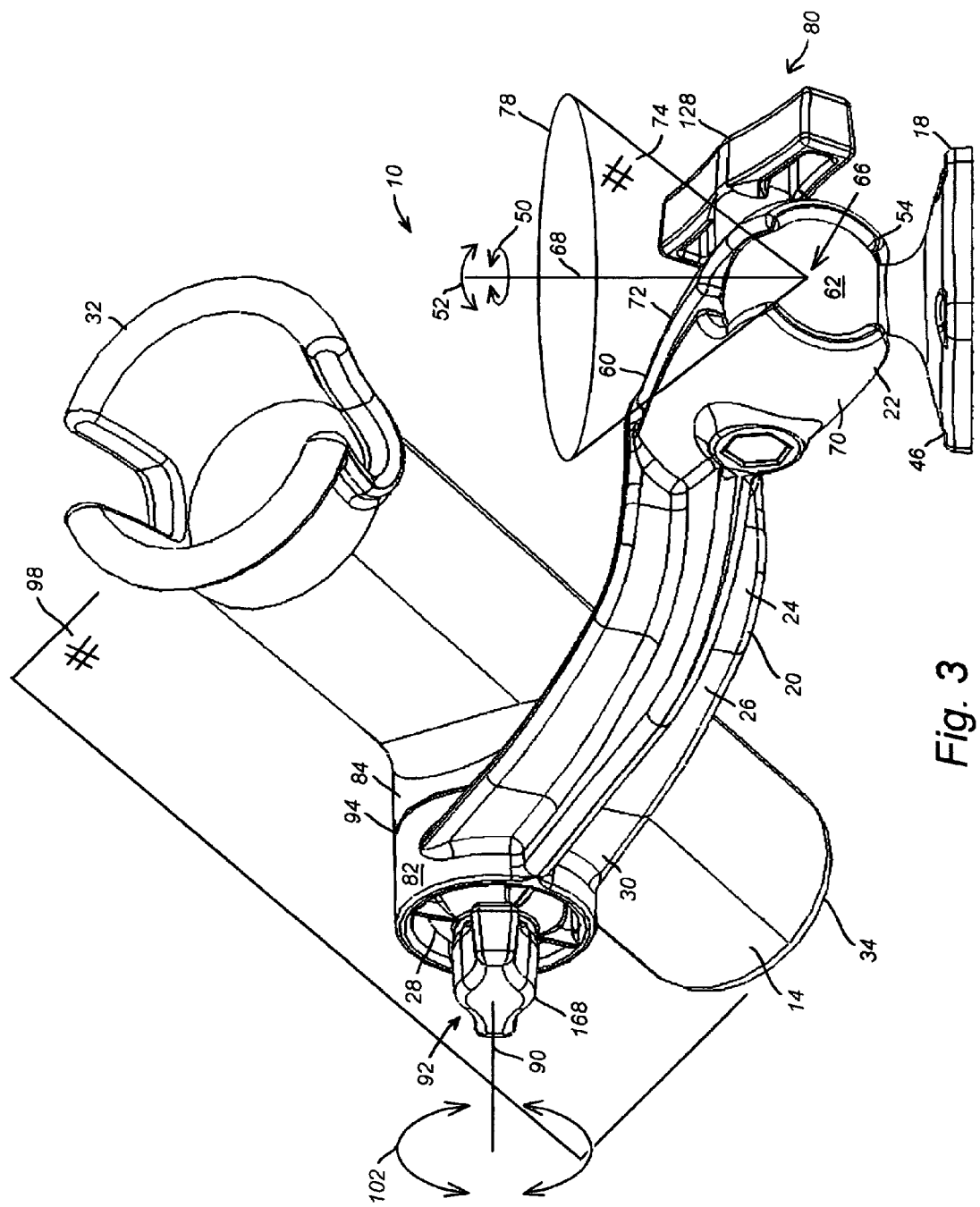
FIG. 3 is a perspective view illustrating by example and without limitation the novel fishing rod holder as being configured in a second attitude with respect to a boat that is different from the first attitude illustrated in FIG. 1 and FIG. 2.

FIG. 3 is a perspective view showing the fishing rod holder 10 of the present invention that is illustrated by example and without limitation as being configured in a second attitude with respect to a boat 12 that is different from the first attitude illustrated in FIGS. 1 and 2. Here, the fishing rod holder 10 is illustrated by example and without limitation as having the attitude of the arm member 20 substantially lowered relative to the boat gunwale 38 by operation of the ball-and-socket joint mechanism 22 between the proximate first end 24 of the lengthwise arm portion 26 of the arm member 20 and the foundation member 18. The transverse clamping mechanism 80 effectively interlocks the angular and rotational attitude of the arm member 20 relative to the foundation member 18, the gunwale 38, and the boat 12 generally. The fishing rod socket member 14 is illustrated by example and without limitation as being adjusting in an angular orientation substantially a reverse of that illustrated in FIGS. 1 and 2 by operation of the releasably interlockable pivot mechanism 28 between the distal second end 30 of the lengthwise arm portion 26 of the arm member 20 and the socket member 14. The axial clamping mechanism 92 effectively interlocks the angular attitude of the socket member 14 relative to the arm member 20.

FIG. 4 is an exploded view of the releasably interlockable ball-and-socket articulation mechanism 22. Here, the relatively rotatable and interlockable ball-and-socket joint mechanism 22 is illustrated by example and without limitation as being typical of the type disclosed in U.S. Pat. No. 6,561,476, which is incorporated herein by reference. By example and without limitation, the relatively rotatable and interlockable ball-and-socket joint mechanism 22 is formed of the split arm assembly 60 in cooperation with the part-spherical head 62 of the ball-end mount or "coupler" 70. The part-spherical head 62 is formed with a substantially smooth outer surface utilizing a pressure deformable, resilient elastomeric material, which renders the part-spherical head 62 relatively resiliently radially compressible. The resiliently deformable part-spherical head 62 is extended on a reduced diameter stem or "neck" 104 relatively upstanding on the base mounting flange 46 portion of the foundation member 18, which is illustrated here by example and without limitation as being substantially disc-shaped. The mounting flange 46 is optionally formed with a quantity of mounting holes 106 for mounting on the boat's gunwale or railing 38 or other relatively stable surface by mechanical fasteners. Alternatively, the mounting flange 46 is securely screwed, bolted, welded or adhesively bonded onto the boat's gunwale 38 or hull 44. Other mounting devices, such as suction cups and clamps, are also contemplated and are considered equivalent structures and are substituted therefore without departing from the scope and intent of the invention.

The split arm assembly 60 is formed of the pair of elongated, relatively rigid arm sections 70, 72 and the clamping mechanism 80 for squeezing together the pair of arm sections 70, 72. The split arm assembly 60 is clamped to the resiliently deformable part-spherical head 62 of the coupler 64 by the clamping mechanism 80 when the rotational orientation and angular attitude of the arm member 20 are adjusted as desired. The pair of operatively opposing first and second sockets 56, 58 of the respective arm sections 70, 72 are each formed having part-spherical surfaces at the inner peripheries thereof that cooperate with the part-spherical head 62 of the coupler 64 to interlock the arm member 20 of the fishing rod holder 10 in a desired rotational orientation and angular attitude.

Optionally, cut-away indentations 108 and 110 are formed at respective rims of the first and second sockets 56 and 58. The cut-away indentations 108, 110 form a channel sized to pass the neck 104 supporting part-spherical head 62 of the coupler 64. The cut-away indentations 108, 110 thus permit the sockets 56, 58 portions of the ball-and-socket joint mechanism 22 to rotate the split arm sections 70, 72 in an extended fan shape outside the conical section 78, thus maximizing the range of possible angular attitudes of the arm member 20.

The clamping mechanism 80 operates the split arm assembly 60 through apertures 112 and 114 formed through the respective arm sections 70, 72 at the center of respective rounded bosses or lands 130, 132 exterior of the first and second arm sections 70, 72.

By example and without limitation, the clamping mechanism 80 is formed of a bolt 120 with an elongated shank that is inserted through the apertures 112, 114 of arm sections 70, 72. A hexagonal head 122 at one end is seated in a mating hexagonal counter-bore 124 of one arm section 70, which retains the bolt 120 against rotation. A threaded shank portion of the bolt 120 extends from the aperture 100 in the second arm section 72 and is engaged by a washer 126 and an internally threaded handle or knob 128 with diametrically opposing wings 130 and 132 for operation as a wing nut. The knob 128 and the bolt 120 function as the clamping mechanism 80, in that the pair of arm sections 70, 72 are squeezed together along the longitudinal axis of the bolt 120 by threading the knob 128 relatively inwardly along the length of the threaded shank portion in the direction of the bolt head 122. The pair of arm sections 70, 72 are allowed to separate from one another by unthreading the knob 128 along the shank portion of the bolt 120 in the opposite direction, to allow the bias of the compressed part-spherical head 62 of the coupler 64 to separate the pair of arm sections 70, 72 from one another.

The arm member 20 of the fishing rod holder 10 is rotationally reoriented and angularly adjusted as desired, and the clamping mechanism 80 is operated to secure the new rotational orientation and angular attitude.

The pressure deformable material of which the part-spherical head 62 of the coupler 64 is composed permits its part-spherical shape to be deformed to conform to the internal contours of the operatively opposing sockets 56, 58 of the respective arm sections 70, 72 when sufficient compressive pressure is applied. The pressure is applied by the threaded clamping mechanism 80. The resilient nature of the material causes the part-spherical head 62 to resume its original part spherically-shaped configuration when the clamping mechanism 80 is released, whereby the compressive pressure is removed.

A first one of the rigid arm sections 70 (shown here by example and without limitation) of the novel fishing rod holder 10 is optionally made integral with the arm member 20. Here, as disclosed by Carnevali in U.S. Pat. Nos. 5,845,885 and 6,561,476, which are incorporated herein by reference, the first one of the rigid arm sections 70 (shown here by example and without limitation) at the proximate first end 24 of the lengthwise arm portion 26 of the arm member 20 is illustrated by example and without limitation as having a partial multisided stem or axle portion 134 formed at one end with a partial disc-shaped button or wheel portion 136. The other arm section 72 is optionally hollow except for its functional features. One functional feature is a collar 138 formed in an end face 140 of the second arm section 72. The collar 138 mates with both the partial multisided axle portion 134 disc-shaped wheel portion 136 of the first arm section 70. For example, the partial axle portion 134 is formed with a convex polygon shape, having multiple flat or planar wall surfaces 142. The collar 138 is formed with a convex polygon-shaped aperture 144 formed in the end face 140 of the arm section 72. The convex polygon-shaped aperture 144 is provided by multiple substantially planar interior wall surfaces 146 that are structured to mate with the planar surfaces 142 of the axle portion 134. Thus, each wall surface 132 is rotated from the adjacent wall surfaces at an angle substantially equal to that of angles between the planar surfaces 142 of the axle portion 134.

The axle portion 134 is long enough to ensure that the collar 138 obtains a suitable grip between the wheel portion 136 and the outer surface of the end face 140 of the arm section 72. The disc-shaped wheel portion 136 is sufficiently thick to support at least a minimum predetermined load applied to the part-spherical head 62 of the coupler 64 when the clamping mechanism 80 is engaged.

FIG. 5 is an exploded view of the releasably interlockable pivot mechanism 28 operating between the distal second end 30 of the lengthwise arm portion 26 of the arm member 20 and the socket member 14. Here, the pivot disk 84 portion of the interlockable pivot mechanism 28 is illustrated by example and without limitation as a hub formed on the socket member 14 and terminating in the receptor face 88. The pivot mechanism 28 is illustrated here by example and without limitation as being releasably interlockable in a stepwise manner. For example, the receptor face 88 of the cooperating pivot disk 84 is formed with a pivoting stepwise interlocking element 150 and the insertion face 86 of the cooperating stationary disk 82 is formed with a stationary stepwise interlocking element 152 structured to cooperate with the first interlocking element 150 to form the releasably interlockable interface joint 94 between the receptor and insertion faces 88 and 86 of the cooperating pivot and stationary disks 84 and 82 for pivoting the socket member 14 about the pivot axis 90 relative to the distal second end 30 of the arm member 20 substantially within the relatively perpendicular pivot plane 98.

Here, first stepwise interlocking element 150 portion of the receptor face 88 of the cooperating pivot disk 84 is illustrated by example and without limitation as including multiple female radial sockets recessed relative to the receptor face 88 and substantially uniformly spaced by a selected angle at regular angular intervals in a substantially circular pattern having an inner diameter defining a central hub 101 and an outer diameter defined by the pivot disk 84. The female radial sockets of the pivoting interlocking element 150 thus resemble spaces between the extended fingers of an open hand. According to one embodiment of the invention, the individual female sockets of the pivoting interlocking element 150 are formed with interior wall surfaces that are angularly inclined inwardly from the receptor face 88 to form a draft between opposing wall surfaces that together form the individual female sockets of the pivoting interlocking element 150. The female radial sockets of the pivoting interlocking element 150 are optionally left with an opening at their outer peripheral ends defined by the diametrical extents of the pivot disk 84, as illustrated. The radial form of the sockets of the pivoting interlocking element 150 causes the interior walls to be angled away from one another by an included angle toward their outer peripheral ends. Stated differently, the female radial sockets of the pivoting interlocking element 150 are more widely spaced at their outer peripheral ends relative to their interior inner ends adjacent to the hub 101.

The cooperating stationary disk 82 portion of the interlockable pivot mechanism 28 is illustrated by example and without limitation as a flattened pancake hub adjacent to the distal second end 30 of the lengthwise arm portion 26 of the arm member 20. Here, the second stepwise interlocking element 152 portion of the insertion face 86 of the cooperating stationary disk 82 is illustrated by example and without limitation as including multiple male radial teeth projected therefrom. The multiple male teeth of the stationary interlocking element 152 are sized and shaped to be received into and mate with the female radial sockets of the pivoting interlocking element 150 in the receptor face 88 of the cooperating pivot disk 84. According to one embodiment of the invention, when the individual female sockets of the pivoting interlocking element 150 of the cooperating pivot disk 84 are formed with draft between opposing interior wall surfaces and being angled away from one another toward their outer peripheral ends, as described herein, the mating male teeth of the stationary interlocking element 152 are formed with mating exterior wall surfaces that are angularly inclined outwardly from the insertion face 86 in a radial gear tooth shape that is sized to mate with and substantially fill the draft between the opposing wall surfaces of the female sockets of the pivoting interlocking element 150. Accordingly, the multiple male teeth of the stationary interlocking element 152 are radially extended with the exterior wall surfaces being angled away from one another toward an outer peripheral end of each radial tooth of the stationary interlocking element 152 at substantially the same angle by which the interior walls of the female radial pivoting interlocking element 150 are angled away from one another. The individual radial teeth of the stationary interlocking element 152 are thus sized and shaped to substantially fill a substantial portion of the corresponding female radial pivoting interlocking element 150. The multiple male teeth of the stationary interlocking element 152 are arranged in a substantially circular pattern having an inner diameter defining a central hub 160 and an outer diameter defined by the stationary disk 82 that are substantially matched to the respective inner and outer diameters of the circular pattern of the recessed radial pivoting interlocking element 150 in the receptor face 88 of the pivot disk 84. The multiple male teeth of the stationary interlocking element 152 are optionally substantially uniformly spaced by the same selected angle as the recessed radial pivoting interlocking element 150 at the same regular angular intervals of the recessed radial pivoting interlocking element 150 about the circular pattern that matches the circular pattern of the recessed radial pivoting interlocking element 150. Alternatively, the circular pattern of radial teeth of the stationary interlocking element 152 is broken at intervals such that the radial teeth of the stationary interlocking element 152 are arranged in multiple clusters similar to the multiple clusters 162a through 162n of in the circular pattern of pyramidal teeth 40, as illustrated here, with each of the clusters having as few as one or more than one of the male teeth of the stationary interlocking element 152. Adjacent clusters 162a, 162n of teeth of the stationary interlocking element 152 are angularly spaced by the angle that is an integer multiple of the angle separating the individual pivoting interlocking element 150. Alternatively, the individual male radial teeth of the stationary interlocking element 152 are angularly spaced on the circular pattern at the angle that is a multiple of the angle separating adjacent female radial pivoting interlocking element 150 on the receptor face 88.

Accordingly, the male radial teeth of the stationary interlocking element 152 are structured to enter different ones of the female radial pivoting interlocking element 150 in different angular rotations of the receptor face 88 of the pivot disk 84 relative to the insertion face 86 of the stationary disk 82. Stated differently, the matching circular arrangements of female radial pivoting interlocking element 150 and male radial teeth of the stationary interlocking element 152 are structured such that the male radial teeth of the stationary interlocking element 152 fit into the female radial pivoting interlocking element 150 at any of many different angularly rotated steps at regular angular intervals around the face 88 of the pivot disk 84. As such, the matching circular arrangements of female radial pivoting interlocking element 150 and male radial teeth of the stationary interlocking element 152 cooperate to provide a means for orienting the insertion face 86 relative to the receptor face 88 in different prescribed angular orientations in stepwise fashion, wherein the steps between different angularly adjacent orientations is prescribed by the angle of the intervals between adjacent female radial pivoting interlocking element 150 on the receptor face 88.

Radially enlarging the outer diameters patterns of cooperating radial pivoting interlocking element 150 and radial teeth of the stationary interlocking element 152 spaces the radial pivoting interlocking element 150 and radial teeth of the stationary interlocking element 152 from the centers of the circular patterns, which increases the holding strength of the pivot mechanism 28 by increasing the lever arm at which the cooperating radial pivoting interlocking element 150 and radial teeth of the stationary interlocking element 152 operate. Radially enlarging the outer diameters patterns and spacing the cooperating radial pivoting interlocking element 150 and teeth of the stationary interlocking element 152 further from the circular centers also increases the number of intervals at which the cooperating radial pivoting interlocking element 150 and radial teeth of the stationary interlocking element 152 can be placed by increasing the linear distance between adjacent angular positions. In other words, the radial pivoting interlocking element 150 can be positioned closer together without breaking into one another when their outer diameter is larger, and therefore, more of the radial pivoting interlocking element 150 can be emplaced, and the angle of the angular intervals between them can be smaller. The size of the matching circular pattern of the radial teeth of the stationary interlocking element 152 must also increase to a matching size with the circular pattern of radial pivoting interlocking element 150, but the quantity of cooperating radial teeth of the stationary interlocking element 152 does not have to increase to take advantage of the larger quantity of radial pivoting interlocking element 150 at narrower angular intervals for decreasing the proscribed angular intervals between different angularly adjacent orientations of the insertion face 86 relative to the receptor face 88. Accordingly, the pivot mechanism 28 is utilized to rotate the fishing rod socket member 14 between the different prescribed angles relative to the arm member 20 and the boat gunwale 38 or other surface of the boat 12 through the pivot disk 84 and stationary disk 82 by engaging different ones of the radial pivoting interlocking element 150 with the radial teeth of the stationary interlocking element 152.

The axial clamping mechanism 92 portion of the pivot mechanism 28 is operated for effectively interlocking the angular attitude of the socket member 14 relative to the arm member 20. The axial clamping mechanism 92 includes a threaded rod or stud 164, a cooperating substantially cylindrical aperture 166, and a handle or knob 168 internally threaded to mate with the stud 164. The threaded rod or stud 164 is projected from the central hub 101 of the pivot disk 84 at substantially the center of the circular pattern of the recessed radial pivoting interlocking element 150. The stud 164 is oriented substantially perpendicular to the receptor face 88. The aperture 166 is formed completely through the central hub 160 of the stationary disk 82 at substantially the center of the circular pattern of the projected male radial teeth of the stationary interlocking element 152 is aligned substantially perpendicular to the substantially planar insertion face 86. The substantially cylindrical aperture 166 is sized to receive the threaded rod or stud 164 there through along the pivot axis 90 oriented substantially transverse of both the socket member 14 and the arm member 20.

The knob 168 is formed with the internally threaded bore 169 that is structured for threadedly engaging the threaded rod or stud 164. As described herein, the knob 168 is turnable by hand for operating in combination with the threaded stud 164 as a means for applying an axial force that forces the receptor face 88 of the pivot disk 84 against the insertion face 86 of the stationary disk 82 along the pivot axis 90. Under the axial force each of the male radial teeth of the stationary interlocking element 152 is unable to move relative to the mating radial pivoting interlocking element 150, and in-turn the socket member 14 is forcibly constrained against angular rotation relative to the arm member 20 which is constrained relative to the boat gunwale 38 or other surface of the boat 12 through connection to the foundation member 18 by means of the relatively rotatable and releasably interlockable ball-and-socket articulation mechanism 22.

Operation of the axial clamping mechanism 92 functions for clamping the receptor face 88 securely against the insertion face 86 with the male radial teeth of the stationary interlocking element 152 inserted into different ones of the recessed radial pivoting interlocking element 150, which effectively constrains the socket member 14 in a selected angular relationship with the arm member 20, as illustrated herein.

The pivot mechanism 28 optionally substitutes other means for applying the force along the pivot axis 90, such as a cam device, which are also known and are considered to be equivalent to the clamping mechanism described herein for practicing the invention without deviating from the scope and intent of the present invention.

According to different embodiments of the invention, pivot mechanism 28 is embodied with different structure to perform the same function to achieve the same result in substantially the same way. For example, the stationary disk 82 portion of the arm member 20 is alternatively formed with the receptor face 88 having the radial pivoting interlocking element 150 formed therein, and the pivot disk 84 portion of the socket member 14 is alternatively formed with the insertion face 86 which includes multiple male radial teeth of the stationary interlocking element 152 projected therefrom. In another example, the radial pivoting interlocking element 150 and radial teeth of the stationary interlocking element 152 are formed as a series of the cooperating truncated pyramidal socket and tooth structures extended radially along the respective receptor and insertion faces 61, 59. According to another example, the axial clamping mechanism 92 is a cam mechanism having the knob 168 structured to operate in concert with the stud 164 for applying the axial force that compresses the insertion face 86 against the receptor face 88 along the pivot axis 90. Accordingly, while the preferred embodiment of the invention has been illustrated and described, it will be appreciated that various changes can be made therein without departing from the spirit and scope of the invention.

Furthermore, as illustrated here, the knob 168 for operating the pivot mechanism 28 is optionally positioned on an opposite side of the arm member 20 from the knob 128 for operating the ball-and-socket joint mechanism 22. Given this arrangement, the user can operate both the pivot mechanism 28 and the ball-and-socket joint mechanism 22 simultaneously by using both hands.

Figure 6:
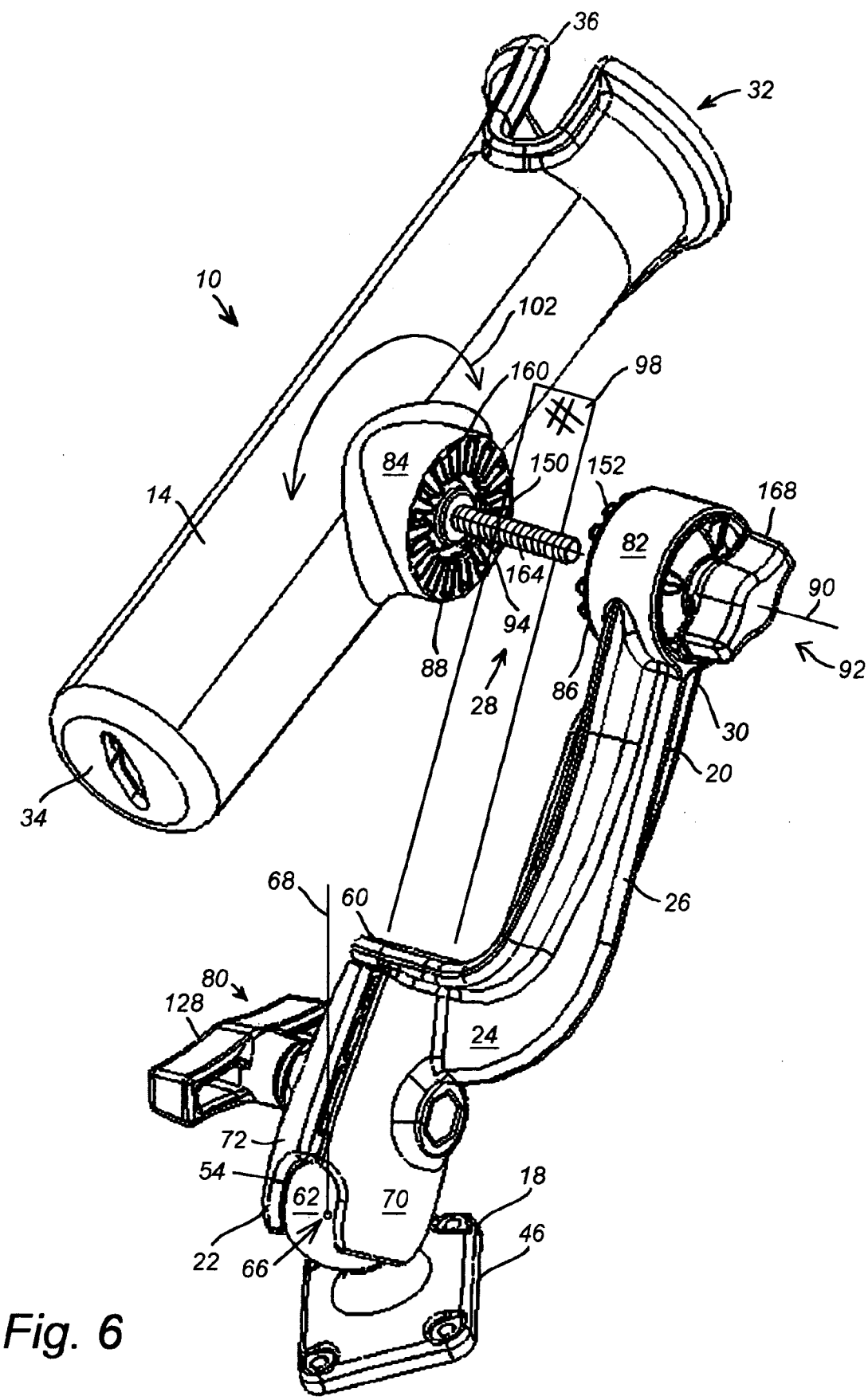
FIG. 6 is another exploded view of the releasably interlockable pivot mechanism of the novel fishing rod holder operating between the distal second end of the arm member and the fishing rod socket member.

FIG. 6 is another exploded view of the releasably interlockable pivot mechanism 28 operating between the distal second end 30 of the lengthwise arm portion 26 of the arm member 20 and the socket member 14.

FIGS. 7 through 11 illustrate the fishing rod holder 10 having both of the relatively rotatable and releasably interlockable ball-and-socket articulation mechanism 22 and the relatively rotatable and releasably interlockable pivot mechanism 28 operated for adjusting the attitude of the fishing rod holder 10. Once attained, the desired attitude of the fishing rod holder 10 is retained by interlocking the proximate first end 24 of the lengthwise arm portion 26 of the arm member 20 in different rotational and angular relationships with the foundation member 18, and interlocking the socket member 14 in different angular orientation relationships with the distal second end 30 of the lengthwise arm portion 26 of the arm member 20. Accordingly, the proximate first end 24 of the lengthwise arm portion 26 of the arm member 20 is illustrated as being arranged in different rotational and angular relationships with the foundation member 18, and the socket member 14 is illustrated as being arranged in different angular orientation relationships with the distal second end 30 of the lengthwise arm portion 26 of the arm member 20.

Figure 7:
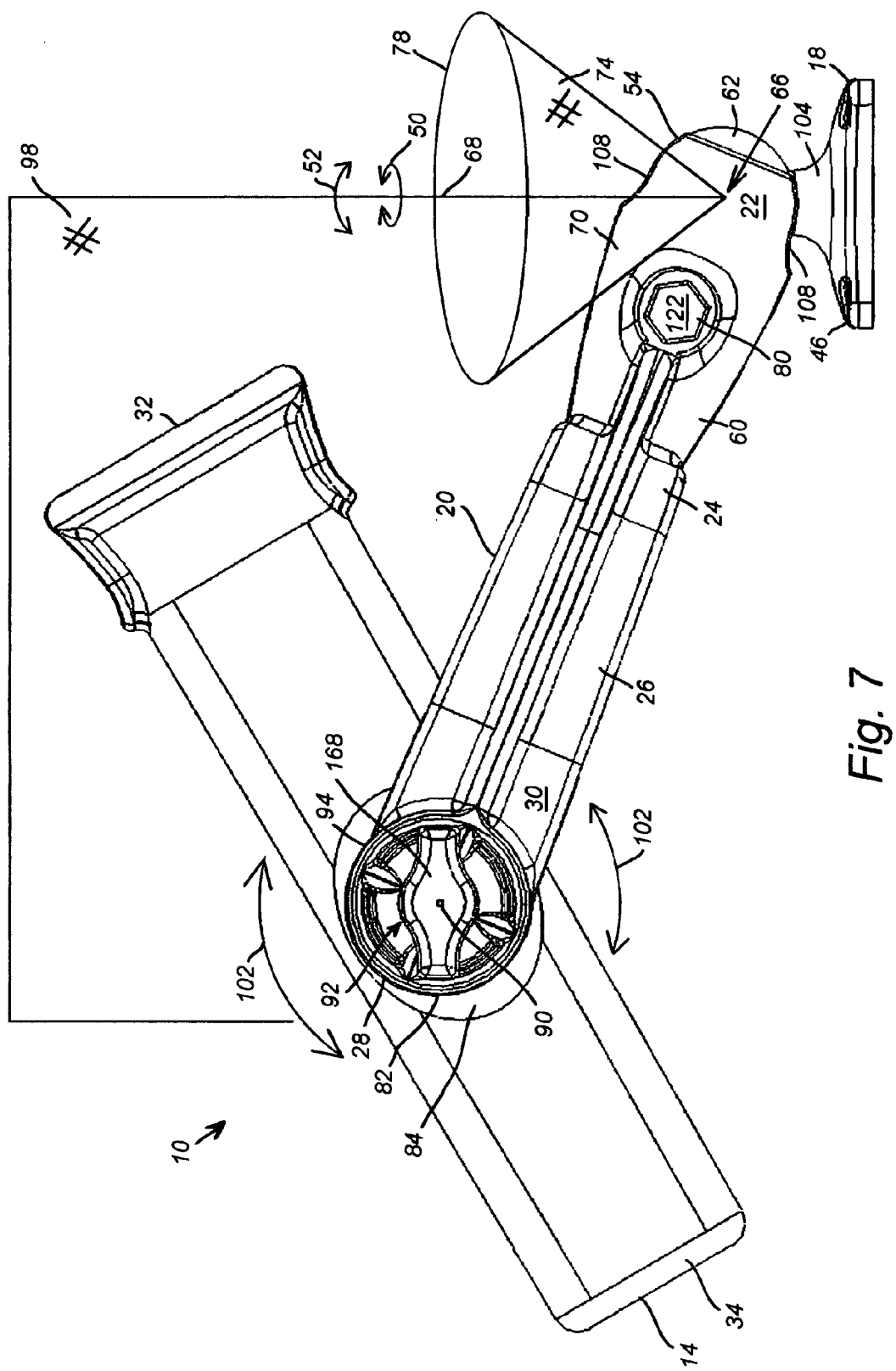
FIGS. 7 through 11 illustrate the novel fishing rod holder having both of the relatively rotatable ball-and-socket articulation mechanism and the relatively rotatable pivot mechanism operated for adjusting the attitude of the fishing rod holder, wherein FIG. 7 particularly points out and illustrates utilization of cut-away indentations formed at respective rims of the sockets in the respective arm sections of the split arm assembly for maximizing the range of angular attitude of the arm member substantially within the plane of the ball-and-socket joint, and FIG. 11 particularly points out illustrates utilization of the lateral offset feature of the novel fishing rod holder offsets the arm member relative to the ball-and-socket joint mechanism such that the fishing rod socket member is substantially aligned with foundation member without interfering with the ball-and-socket joint mechanism.
Figure 8:
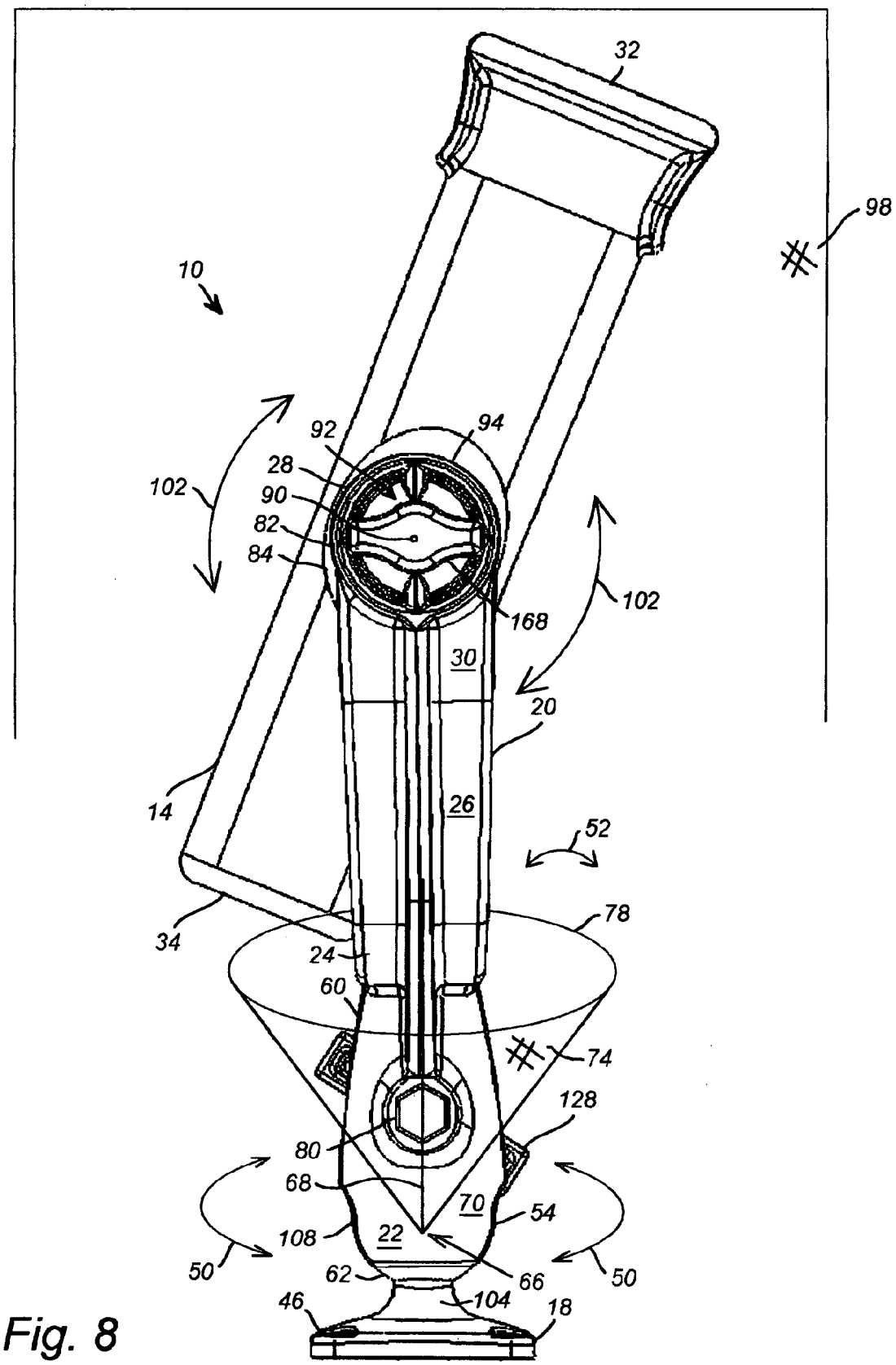
Figure 9:
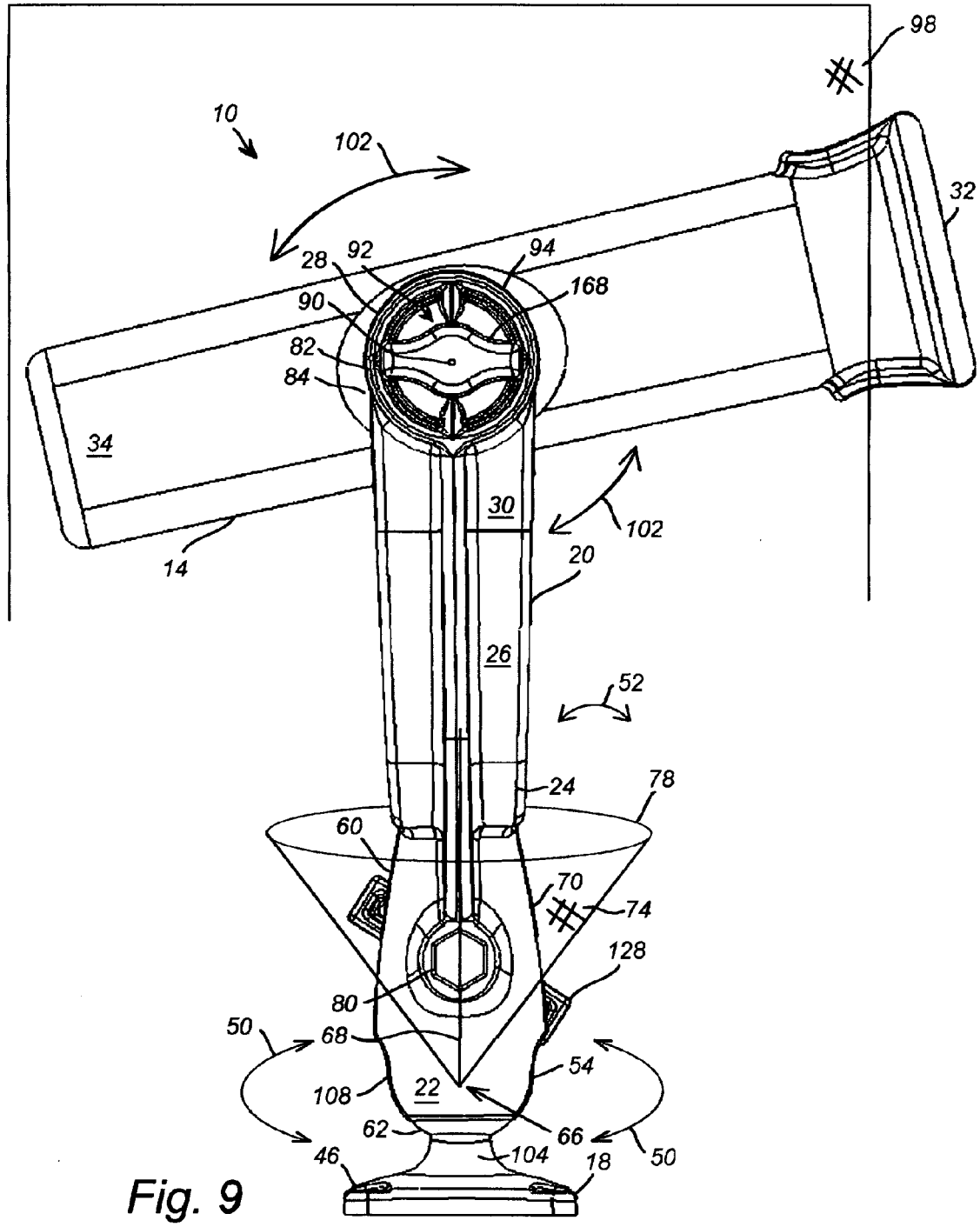
Figure 10:
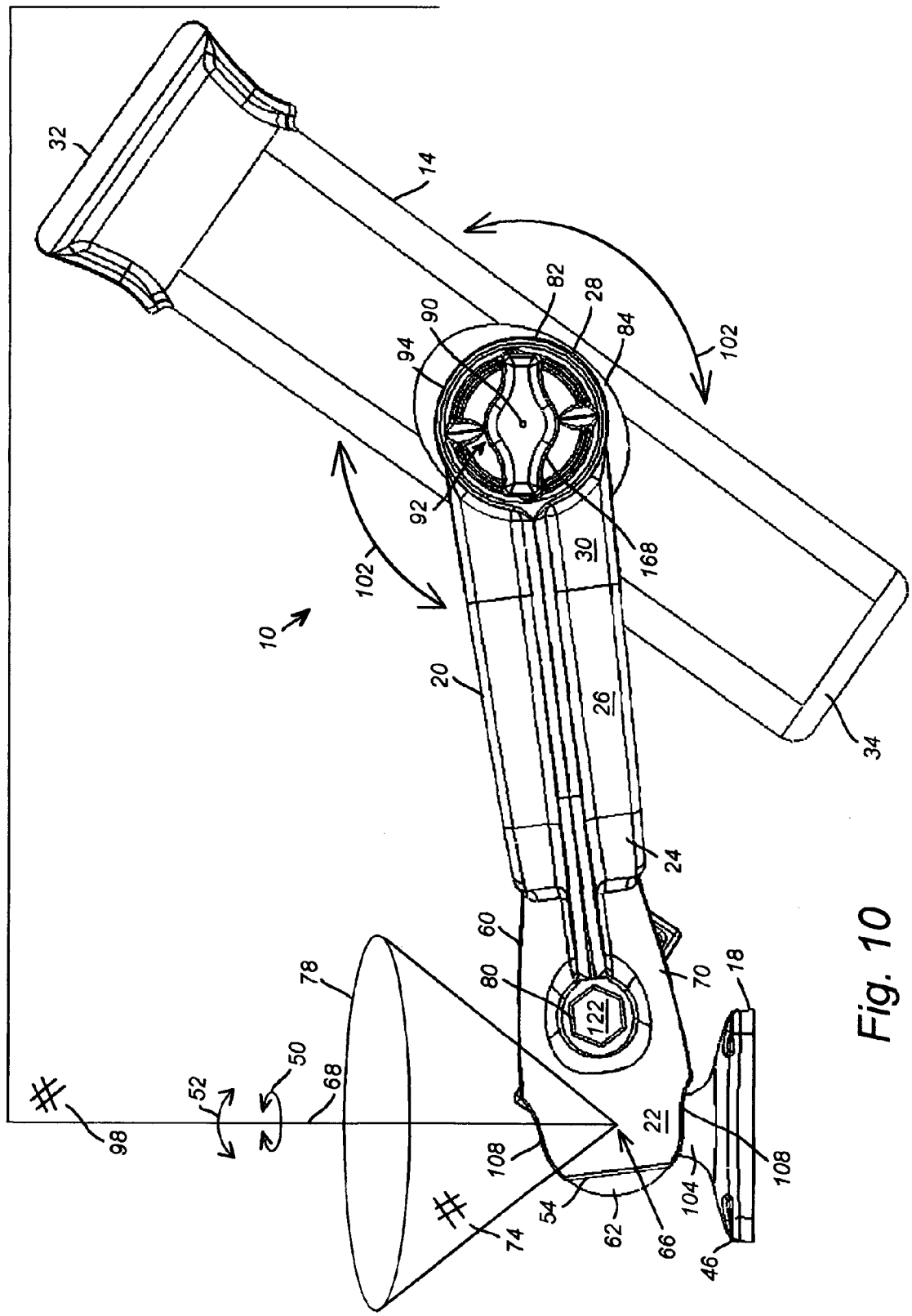

In particular, FIG. 7 points out illustrates utilization of the cut-away indentations 108 (shown) and 110 formed at respective rims of the first and second sockets 56 (shown) and 58 in the respective arm sections 70 (shown) and 72 of the split arm assembly 60 for maximizing the range of angular attitude of the arm member 20 of the novel fishing rod holder 10 substantially within the plane 74 bisecting the part-spherical head 62 of the coupler 64 through the center of revolution of the ball-and-socket joint 54. Accordingly, the pivot plane 98 and plane 74 bisecting the part-spherical head 62 of the coupler 64 are substantially coincident. As illustrated here, the cut-away indentations 108, 110 thus permit the sockets 56, 58 portions of the ball-and-socket joint mechanism 22 to rotate the split arm sections 70, 72 in an extended fan shape outside the conical section 78.

Figure 11:
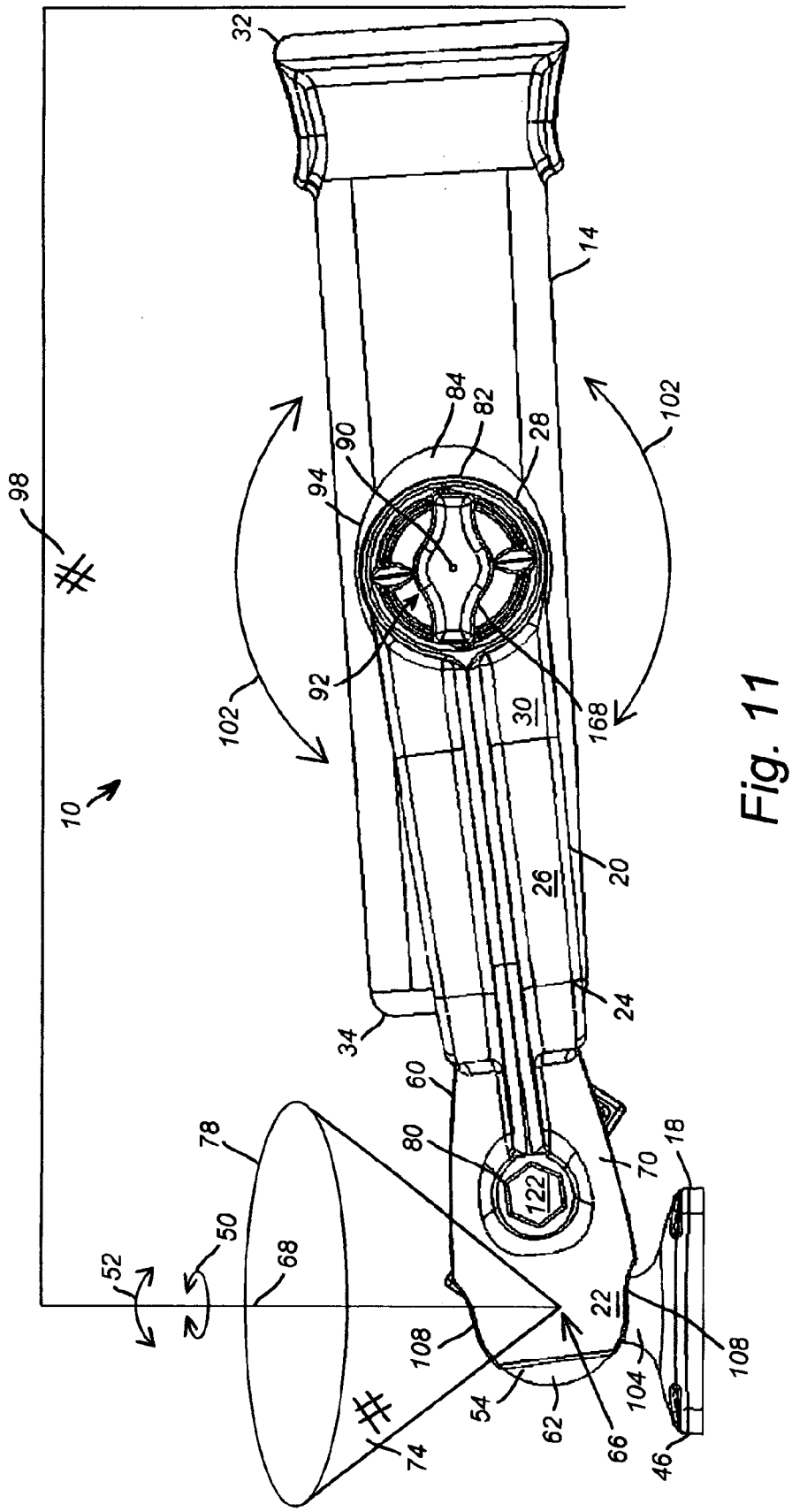

FIG. 11 particularly points out illustrates utilization of the lateral offset feature 96 of the novel fishing rod holder 10 adjacent to the first end 24 proximate to the split arm assembly 60 offsets the lengthwise arm portion 26 of the arm member 20 relative to the ball-and-socket joint mechanism 22. Here, the socket member 14 is substantially aligned with foundation member 18 without interfering with the ball-and-socket joint mechanism 22.

Figure 12:
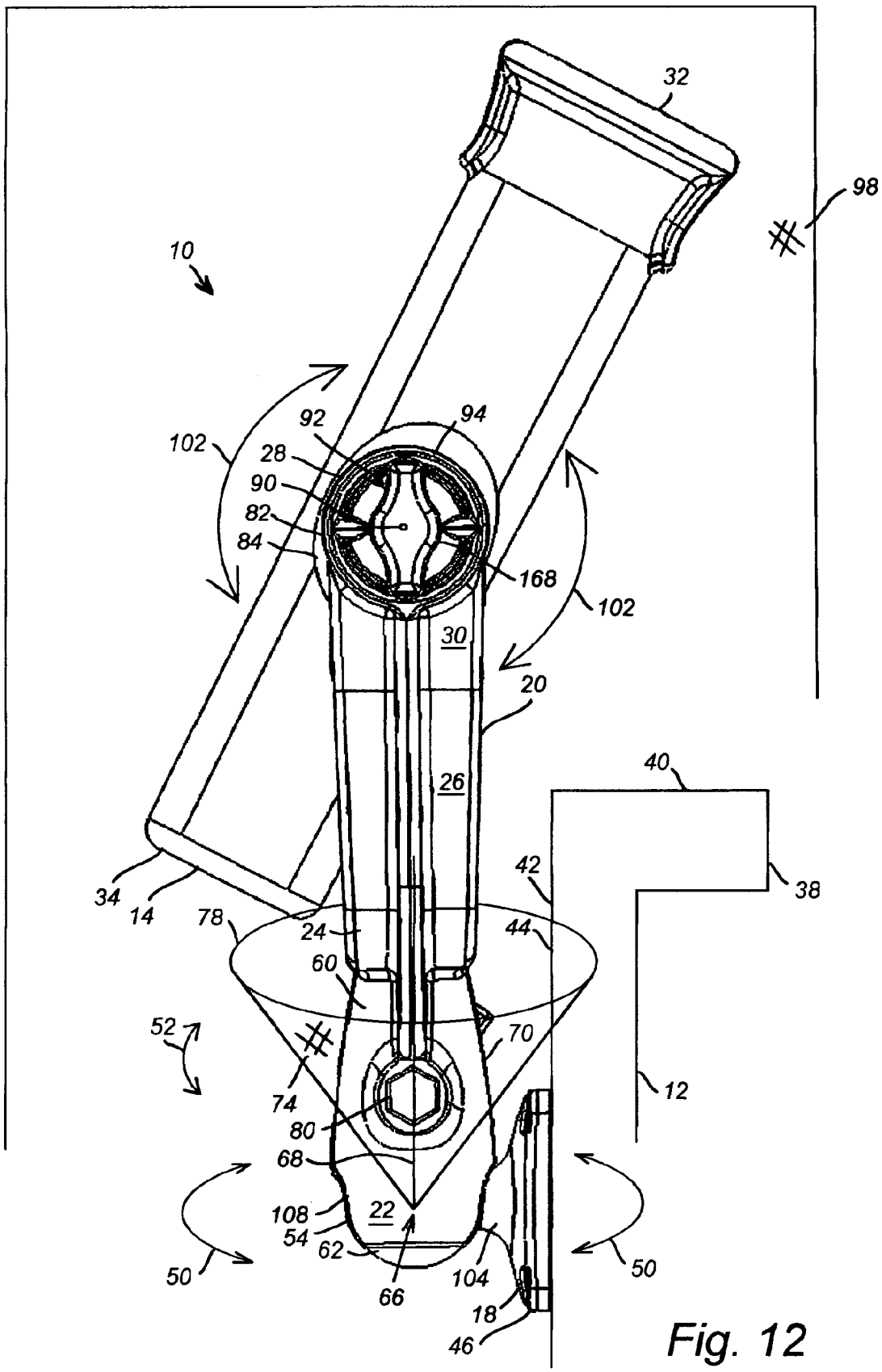
FIG. 12 illustrates the utility of the relatively rotatable ball-and-socket joint mechanism of the novel fishing rod holder to permit orienting of the foundation member in different relationships with the boat's gunwale or railing or other relatively stable surface, including the boat's hull.

FIG. 12 illustrates the utility of the relatively rotatable ball-and-socket joint mechanism 22 to permit orienting of the foundation member 18 in different relationships with the boat's gunwale or railing 38 or other relatively stable surface, including the hull 44. Accordingly, the mounting flange 46 portion of the foundation member 18 is illustrated here by example and without limitation as being mounted substantially upright with the stem 104 extending the part-spherical head 62 of the coupler 64 sideways of the boat's gunwale or railing 38. The range of motion provided by the ball-and-socket joint 54, especially in the area of the cut-away indentations 108 and 110 formed at respective rims of the first and second sockets 56 and 58, maximizes the range of possible angular attitudes of the arm member 20.

Figure 13:
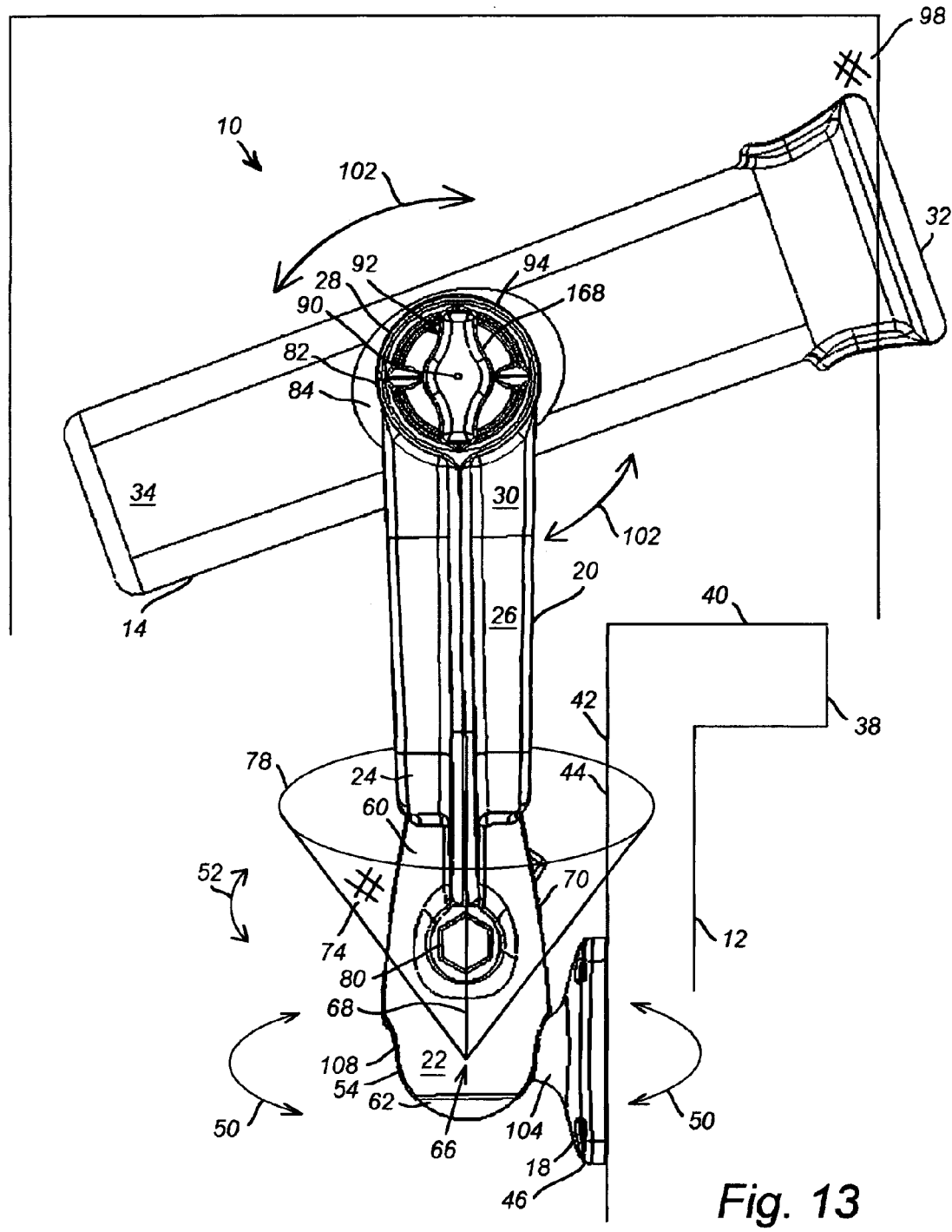
FIG. 13 illustrates that the range of motion of the of the novel fishing rod holder is maximized by the ball-and-socket joint mechanism to such extent that, when the foundation member is mounted sideways as on the inside surface of the boat's hull (shown) or gunwale, the fishing rod socket member is extendable above the gunwale or railing and retains a large range of motion about the pivot axis while still being rotatable between different rotational orientation relative to the rotatable ball-and-socket joint mechanism.

FIG. 13 illustrates that the range of motion of the of the fishing rod holder 10 is maximized by the ball-and-socket joint mechanism 22 to such extent that, when the foundation member 18 is mounted sideways, as on the inside surface 42 of the boat's hull 44 (shown) or gunwale 38, the fishing rod socket member 14 is extendable above the gunwale or railing 38 and retains a large range of motion about the pivot axis 90 while still being rotatable between different rotational orientation relative to the coupler 64.

Figure 14:
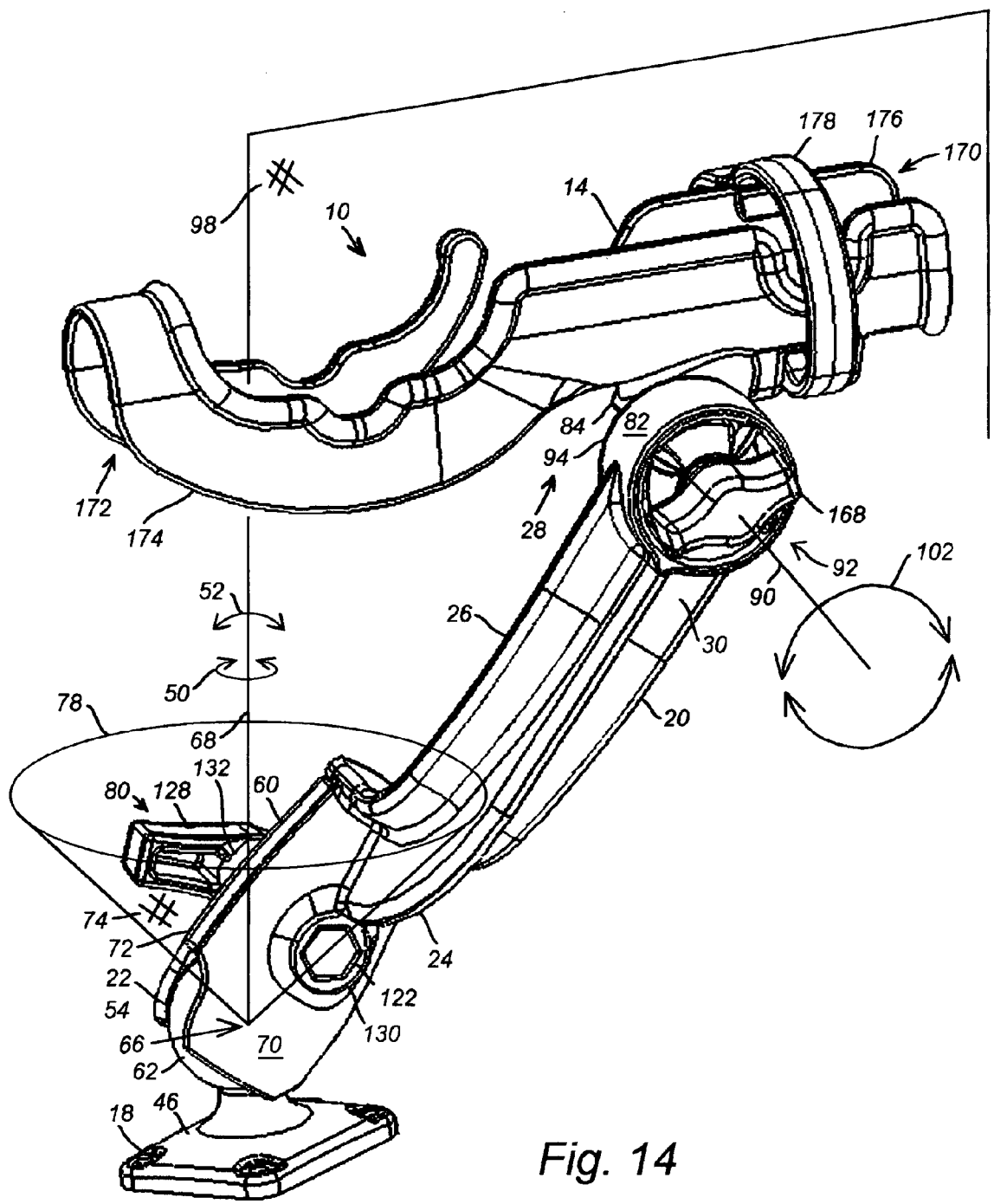
FIG. 14 illustrates the novel fishing rod holder, wherein the fishing rod socket member is a different configuration from that illustrated in FIG. 1.

FIG. 14 illustrates the fishing rod holder 10, wherein the fishing rod socket member 14 is a different configuration from that illustrated in FIG. 1. Here, the fishing rod socket member 14 is formed of a strong and substantially rigid material, such as metal or rigid plastic and is illustrated by example and without limitation as a type of cut-away tubular socket member, having opposing upper and lower partial longitudinal openings 170 and 172 sized to receive the handle of a conventional fishing rod. A rear portion 174 of the partial upper opening 170 is structured so as to better slideably receive an open face reel associated with the fishing rod handle 16, while a forward portion 176 includes a quick release bail 178 structured for swinging over the partial upper opening 170 for retaining a spinning rod in the cut-away tubular socket member 14. The pivot disk 84 portion of the releasably interlockable pivot mechanism 28 is positioned here adjacent to the forward portion 176 of the cut-away tubular socket member 14.

Figure 15:
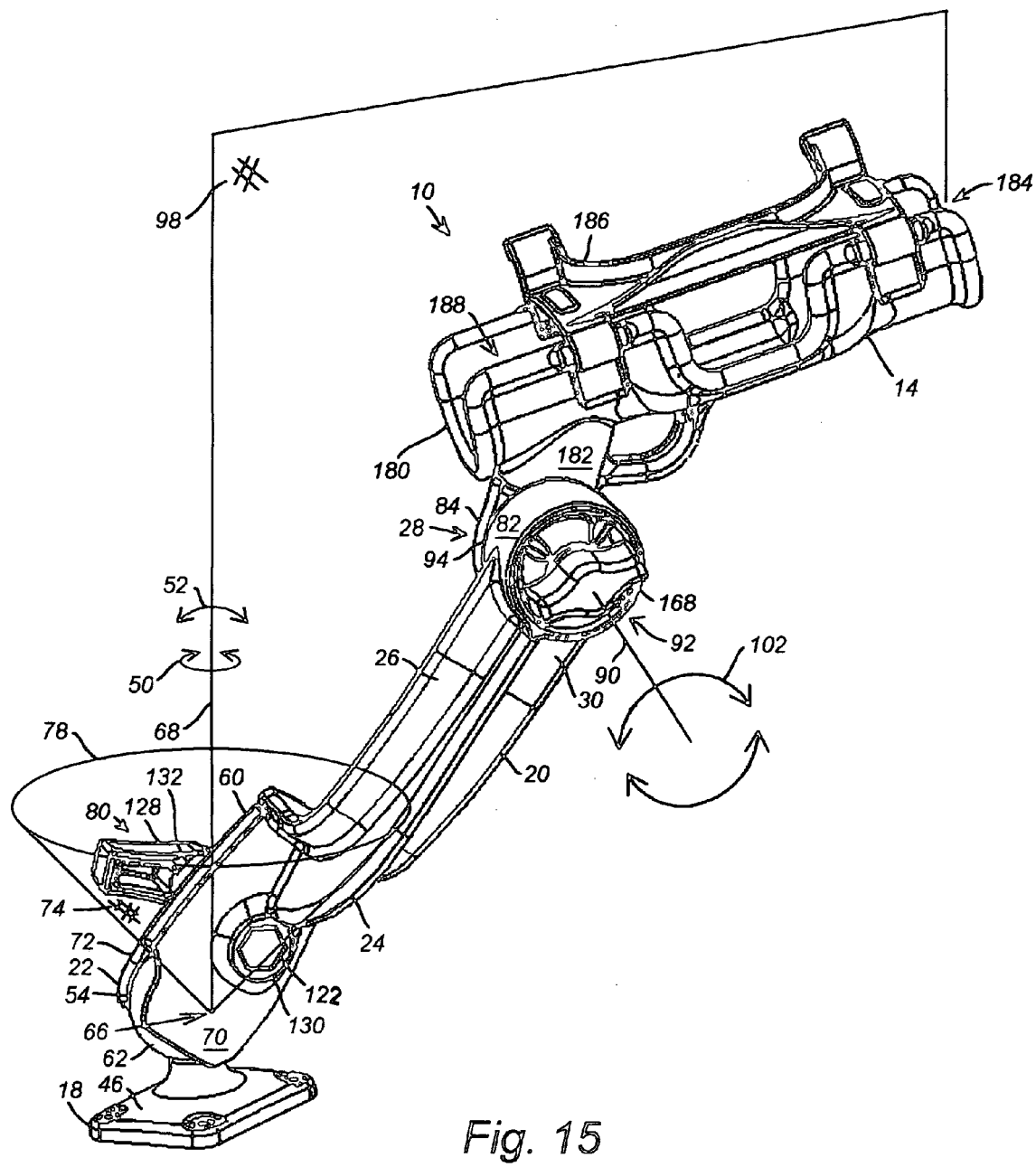
FIG. 15 illustrates the novel fishing rod holder, wherein the fishing rod socket member is another different configuration from that illustrated in FIG. 1.

FIG. 15 illustrates the fishing rod holder 10, wherein the fishing rod socket member 14 is another different configuration from that illustrated in FIG. 1. Here, the fishing rod socket member 14 is formed of a strong and substantially rigid material, such as metal or rigid plastic and is illustrated by example and without limitation as a type of fishing rod socket having an elongated semi-tubular U-shaped barrel 180 projected from a rear portion 182 including the pivot disk 84, and a forward longitudinal opening 184. A different quick release bail 186 is rotatably structured for swinging over an upper longitudinal opening 188 for retaining a spinning rod in the barrel 180, substantially as disclosed by example and without limitation in U.S. patent application Ser. No. 11/701, 126, entitled "Fishing Rod Holder," filed in the name of the sole inventor of the present invention on Jan. 31, 2007, the complete disclosure of which is incorporated herein by reference.

Figure 16:
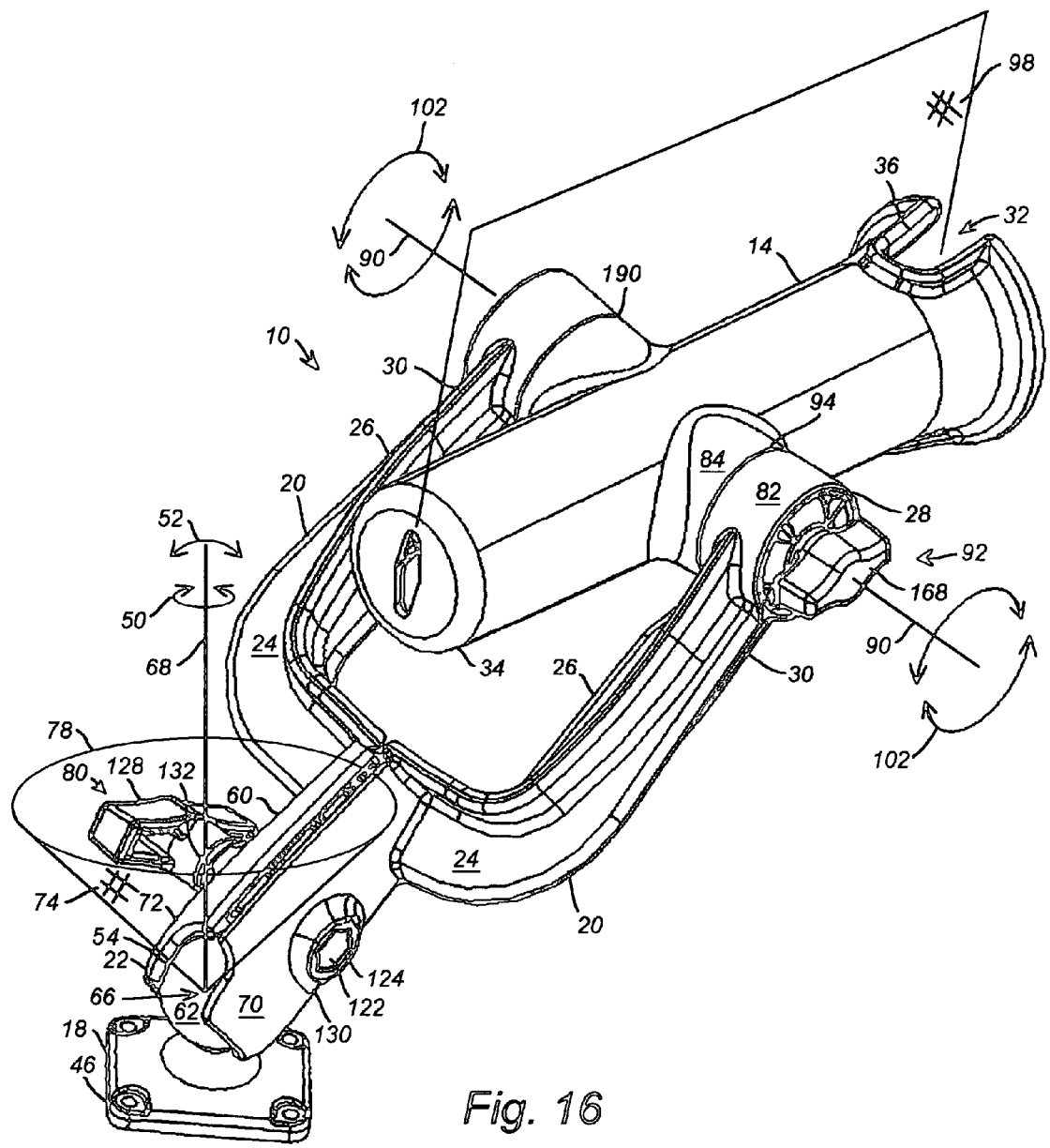
FIG. 16 illustrates an alternative embodiment of the novel fishing rod holder, wherein a pair of arm sections pivotably support the fishing rod socket member, one on each side of thereof.

FIG. 16 illustrates an alternative embodiment of the fishing rod holder 10, wherein each of the arm sections 70 and 72 of the split arm assembly 60 includes one of the arm members 19, one on each side of the fishing rod socket member 14. Furthermore, the fishing rod socket member 14 includes a pair of the pivot disks 84 with one located on each side and substantially aligned along the pivot axis 90. Each of the two pivot disks 84 interfaces with the stationary disk 82 on an associated one of the arm members 19. The fishing rod socket member 14 is thus supported from both sides. Optionally, only one of the two pivot disks 84 and its associated stationary disk 82 is formed with the interlocking insertion and receptor faces 86 and 88 so that only one hand is needed to operate the axial clamping mechanism 92 controlling the releasable interlocking of the interface joint 94. Accordingly, as illustrated, an ordinary pivot and axle joint 190 supports the second side of the fishing rod socket member 14 relative to the second arm member 20.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A fishing rod holder, comprising:
   a foundation member comprising a first side and a second side;
   a socket member structured for releasably retaining a fishing rod, the socket member having an upper end, a butt end, and a longitudinal axis extending therebetween, the socket member further comprising an opening at the upper end which extends from the upper end and into the socket member along the longitudinal axis;
   an arm member coupled between the foundation member and the socket member; and
   a releasably interlockable ball-and-socket articulation mechanism coupled between the foundation member and a first end of the arm member, whereby the arm member is further rotatable within at least a substantially continuous conical section relative to the foundation member, and wherein the ball-and-socket articulation mechanism is encompassed between the first and second sides of the foundation member with the second side of the foundation member being positioned between the first side of the foundation member and a second end of the arm member; and
   a relatively rotatable and releasably interlockable pivot mechanism coupled between the socket member and the second end of the arm member, the socket member being pivotable relative to the arm member in circumvolution both about a pivot axis oriented substantially transverse of the conical section and within a plane between the second end of the arm member and the first side of the foundation member, wherein at least the butt end of the socket member is fully pivotable relative to the ball-and-socket articulation mechanism, the pivot mechanism being offset relative to the ball-and-socket articulation mechanism a first distance greater than a second distance between the pivot mechanism and one of said upper end and said butt end of the socket member throughout the entire circumvolution of the socket member relative to the arm member, and wherein the second end of the arm member is laterally offset from the ball-and-socket articulation mechanism.

2. The fishing rod holder of claim 1 wherein the socket member is substantially aligned with the ball-and-socket articulation mechanism.

3. The fishing rod holder of claim 1, wherein the plane between the second end of the arm member and the first side of the foundation member further intersects the ball-and-socket articulation mechanism.

4. The fishing rod holder of claim 3 wherein the pivot mechanism further comprises a plurality of female radial sockets and mating male teeth operable between the socket member and the second end of the arm member.

5. The fishing rod holder of claim 4 wherein the socket member is further pivotable relative to the arm member in a continuous circumvolution about the pivot axis.

6. The fishing rod holder of claim 1, wherein the pivot mechanism further comprises:
   a stationary disk adjacent to the second end of the arm member distal from the ball-and-socket articulation mechanism;

a pivot disk coupled to the socket member and substantially aligned with the stationary disk along the pivot axis;

a releasably interlockable interface joint between respective opposing faces of the stationary and pivot disks; and an axial clamping mechanism operable along the pivot axis between the stationary and pivot disks.

7. The fishing rod holder of claim 6 wherein the interface joint between respective opposing faces of the stationary and pivot disk further comprises a stepwise interface joint.

8. The fishing rod holder of claim 7 wherein the stepwise interface joint further comprises mating teeth and sockets provided between the opposing faces of the stationary and pivot disks.

9. A fishing rod holder, comprising:

a foundation member comprising a ball-end coupler projected from a base mounting flange and further comprising a part-spherical head portion projected from the flange, wherein the foundation member further comprises a first side and a second side encompassing the ball-end coupler;

a fishing rod socket member comprising means for receiving a fishing rod, the fishing rod socket member having an upper end, a butt end, and a longitudinal axis extending therebetween, the fishing rod socket member further comprising an opening at the upper end which extends from the upper end and into the fishing rod socket member along the longitudinal axis; and an adjustable attitude arm member comprising a lengthwise arm portion and adjacent to a first end portion thereof further comprising a first cooperating means for forming a relatively rotatable ball-and-socket articulation mechanism with the part-spherical head portion of the coupler and operable about a spherical center thereof within at least a substantially continuous conical section having an apex at the spherical center of the head portion, and a second end portion thereof distal from the first end portion, wherein the second side of the foundation member is positioned between the first side of the foundation member and the second end portion of the arm member, and adjacent to the second end portion thereof the arm member further comprising means for coupling the fishing rod socket member thereto, the entire fishing rod socket member being rotatable relative to the second end portion of the arm member in a continuous circumvolution about a pivot axis that is oriented substantially transverse of a plane containing an axis of revolution of the conical section, and wherein the arm member further comprises means for offsetting the second end portion thereof laterally of the first cooperating means adjacent to the first end portion thereof, and further for aligning the fishing rod socket member substantially coplanar with a plane encompassed between the first side of the foundation member and the second end portion of the arm member; and a ball-and-socket mechanism clamping means for releasably interlocking the first cooperating means and the ball-and-socket articulation mechanism.

10. The fishing rod holder of claim 9 wherein the plane encompassed between the first side of the foundation member and the second end portion of the arm member further comprises a plane containing the spherical center of the part-spherical head portion of the coupler.

11. The fishing rod holder of claim 9 wherein:

the fishing rod socket member further comprises a pivot member;

the means for coupling the fishing rod socket member further comprises second cooperating means for forming a relatively rotatable pivot mechanism with the pivot member of the fishing rod socket member, wherein the pivot mechanism is further operable in a continuous circumvolution about the pivot axis; and an axial pivot mechanism clamping means for releasably interlocking the pivot mechanism between the fishing rod socket member and the second end of the arm.

12. The fishing rod holder of claim 11 wherein the pivot mechanism further comprises means for forming a relatively rotatable and releasably interlockable interface joint between the pivot member of the fishing rod socket member and the second cooperating means of the arm member.

13. The fishing rod holder of claim 12 wherein the means for forming a releasably interlockable interface joint between the pivot member of the fishing rod socket member and the second cooperating means of the arm member further comprises means for forming a stepwise interlockable interface joint.

14. The fishing rod holder of claim 13 wherein the means for offsetting the second end portion of the arm member further comprises means for offsetting the second cooperating means adjacent to the second end portion of the arm member laterally of the first cooperating means adjacent to the first end portion of the arm member, and the means for aligning the fishing rod socket member substantially coplanar with the plane encompassed between the first side of the foundation member and the second end portion of the arm member further comprising means for aligning a pivot plane containing the continuous planar circumvolution of the fishing rod socket member about the pivot axis substantially coplanar with the plane containing the spherical center of the part-spherical head portion of the coupler.

15. The fishing rod holder of claim 13 wherein:

the ball-and-socket mechanism clamping means further comprises an operating handle means for releasably interlocking the first cooperating means and the ball-and-socket articulation mechanism;

the stepwise interlockable interface joint of the pivot mechanism further comprises a plurality of interlockable female radial sockets and mating male teeth operable in stepwise fashion between the pivot member of the fishing rod socket member and the second cooperating means of the arm member;

the axial pivot mechanism clamping means further comprises an operating handle means for releasably interlocking the interlockable female radial sockets and mating male teeth of the pivot mechanism; and the axial pivot mechanism clamping means further comprises an operating handle means for releasably interlocking the interlockable female radial sockets and mating male teeth of the pivot mechanism; and the operating handle means for releasably interlocking the first cooperating means and the ball-and-socket articulation mechanism and the operating handle means for releasably interlocking the pivot mechanism are further located on substantially opposite sides of the arm member.

16. A fishing rod holder, comprising:

a foundation member comprising a ball-end coupler projected from a base mounting flange and further comprising a part-spherical head portion;

an adjustable attitude arm member comprising a lengthwise arm portion forming a split arm assembly adjacent to a first proximate end portion thereof and forming a pair of operatively opposing first and second sockets structured to cooperate with the part-spherical head portion of the coupler for forming a ball-and-socket articulation mechanism therewith and being relatively rotatable within at least a continuous conical section having an apex located at a geometric spherical center of the part-spherical head portion of the ball-end coupler of the foundation member, a stationary interlocking element adjacent to a second distal end portion thereof and defining a pivot axis, and wherein the arm member further comprises a lateral offset between the split arm assembly and a joint interface surface of the stationary interlocking element;

a transverse clamping mechanism structured for releasably interlocking the first and second sockets with the ball-end coupler of the foundation member;

a fishing rod socket member structured for releasably receiving a fishing rod, the fishing rod socket member comprising an upper end, a butt end, and a longitudinal axis extending therebetween, the fishing rod socket member further comprising an opening at the upper end which extends from the upper end and into the fishing rod socket member along the longitudinal axis, and the fishing rod socket member further comprising a pivoting interlocking element coupled for pivoting in a continuous circumvolution about the pivot axis relative to the stationary interlocking element of the arm member within a pivot plane oriented perpendicular to the pivot axis, the pivoting interlocking element further being structured for cooperating with the stationary interlocking element for forming a relatively rotatable interface joint therebetween, and the lateral offset being substantially equivalent to approximately one half of a thickness of the fishing rod socket member; and an axial clamping mechanism coupled for releasably compressing the respective opposing stationary and pivoting interlocking elements along the pivot axis for releasably interlocking the relatively rotatable interface joint therebetween.

17. The fishing rod holder of claim 16 wherein the transverse clamping mechanism further comprises an operating handle;

the axial clamping mechanism further comprises an operating handle; and the operating handle of the transverse clamping mechanism and the operating handle of the axial clamping mechanism are further located on substantially opposite sides of the arm member.

18. The fishing rod holder of claim 16 wherein the pivot plane includes the apex of the conical section.

19. The fishing rod holder of claim 18 wherein the pivot plane is further substantially coincident with an axis of revolution of the conical section.

20. The fishing rod holder of claim 16 wherein:

the split arm assembly further comprises a pair of substantially rigid arm sections split along a plane substantially bisecting the part-spherical head portion of the coupler;

the transverse clamping mechanism being operable along an axis oriented substantially transverse of the plane substantially bisecting the part-spherical head portion of the coupler along which the pair of arm sections are split; and the pivot axis being oriented substantially parallel with the axis along which the transverse clamping mechanism is operable and the axial clamping mechanism being operable there along.

21. The fishing rod holder of claim 20 wherein the interface joint between respective stationary and pivoting interlocking elements further comprises a stepwise interface joint.

22. The fishing rod holder of claim 21 wherein the stationary and pivoting interlocking elements further comprises mating teeth and socket elements forming the stepwise interface joint therebetween.

* * * * *